United States Patent
Kurashige et al.

(10) Patent No.: US 9,176,365 B2
(45) Date of Patent: Nov. 3, 2015

(54) ILLUMINATION DEVICE, PROJECTION DEVICE, AND PROJECTION-TYPE IMAGE DISPLAY DEVICE

(75) Inventors: Makio Kurashige, Kashiwa (JP); Kazutoshi Ishida, Saitama (JP); Tomoe Takanokura, Katsushika (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 341 days.

(21) Appl. No.: 13/821,734

(22) PCT Filed: Sep. 8, 2011

(86) PCT No.: PCT/JP2011/070528
§ 371 (c)(1),
(2), (4) Date: Mar. 8, 2013

(87) PCT Pub. No.: WO2012/033178
PCT Pub. Date: Mar. 15, 2012

(65) Prior Publication Data
US 2013/0169936 A1    Jul. 4, 2013

(30) Foreign Application Priority Data
Sep. 8, 2010   (JP) .................................. 2010-201411

(51) Int. Cl.
*G03B 21/14*   (2006.01)
*G02B 27/28*   (2006.01)
(Continued)

(52) U.S. Cl.
CPC . *G03B 21/14* (2013.01); *F21V 9/14* (2013.01); *G02B 5/0252* (2013.01);
(Continued)

(58) Field of Classification Search
USPC ....... 353/8, 20; 352/62; 349/15; 359/23, 465, 359/464; 348/55, 57
See application file for complete search history.

(56) References Cited

U.S. PATENT DOCUMENTS

| 5,313,479 A | 5/1994 | Florence |
| 6,206,532 B1 * | 3/2001 | Hawes ............................. 362/19 |

(Continued)

FOREIGN PATENT DOCUMENTS

| EP | 0 821 293 A2 | 1/1998 |
| EP | 1 450 202 A2 | 8/2004 |

(Continued)

OTHER PUBLICATIONS

Extended European Search Report (Application No. 13002139.7) dated May 30, 2014.

(Continued)

*Primary Examiner* — William C Dowling
(74) *Attorney, Agent, or Firm* — Burr & Brown, PLLC

(57) ABSTRACT

An illumination device includes: an optical element which including a hologram recording medium including a first zone and a second zone and can reproduce an image of a scattering plate; an irradiation device which irradiates the optical element with a coherent light beam such that the light beam is allowed to scan the hologram recording medium; and a polarization control unit provided on an optical path of the light beam to an illuminated zone. The light beams incident on respective positions of the hologram recording medium are allowed to reproduce the image superimposed on the illuminated zone. The polarization control unit controls polarization of the light beams such that the light beam incident on the first zone to travel toward the illuminated zone and the light beam incident on the second zone to travel toward the illuminated zone are configured with different polarization components.

19 Claims, 13 Drawing Sheets

(51) Int. Cl.
  *G02B 27/48* (2006.01)
  *G03B 21/40* (2006.01)
  *G03B 35/18* (2006.01)
  *G03H 1/22* (2006.01)
  *G03H 1/32* (2006.01)
  *F21V 9/14* (2006.01)
  *G03H 1/20* (2006.01)
  *G02B 5/02* (2006.01)
  *G03H 1/00* (2006.01)

(52) U.S. Cl.
  CPC ............ *G02B 27/286* (2013.01); *G02B 27/48* (2013.01); *G03B 21/40* (2013.01); *G03B 35/18* (2013.01); *G03H 1/20* (2013.01); *G03H 1/22* (2013.01); *G03H 1/2286* (2013.01); *G03H 1/32* (2013.01); *G03H 1/0005* (2013.01); *G03H 2222/31* (2013.01); *G03H 2222/36* (2013.01)

(56) References Cited

U.S. PATENT DOCUMENTS

| | | | |
|---|---|---|---|
| 7,429,111 B2 * | 9/2008 | Ockenfuss | 353/20 |
| 8,408,708 B2 * | 4/2013 | Sharp | 353/7 |
| 8,870,382 B2 * | 10/2014 | Yankov et al. | 353/20 |
| 2003/0086034 A1 | 5/2003 | Yoon | |
| 2005/0237487 A1 * | 10/2005 | Chang | 353/7 |
| 2008/0219302 A1 | 9/2008 | Nakayama et al. | |
| 2008/0239244 A1 | 10/2008 | Yamauchi et al. | |
| 2009/0161072 A1 * | 6/2009 | Yamauchi et al. | 353/20 |
| 2009/0168424 A1 | 7/2009 | Yamauchi et al. | |
| 2010/0020291 A1 | 1/2010 | Kasazumi et al. | |
| 2010/0110166 A1 * | 5/2010 | Chang | 348/57 |
| 2010/0253769 A1 * | 10/2010 | Coppeta et al. | 348/58 |
| 2011/0205496 A1 * | 8/2011 | Schuck et al. | 353/8 |
| 2012/0044553 A1 * | 2/2012 | Kurashige | 359/15 |
| 2013/0016321 A1 * | 1/2013 | Duelli et al. | 353/20 |
| 2013/0169936 A1 * | 7/2013 | Kurashige et al. | 353/20 |
| 2013/0169940 A1 * | 7/2013 | Takanokura et al. | 353/31 |
| 2013/0170007 A1 * | 7/2013 | Kurashige et al. | 359/24 |
| 2014/0055754 A1 * | 2/2014 | Chuang et al. | 353/20 |
| 2014/0176912 A1 * | 6/2014 | Turner | 353/8 |
| 2014/0340651 A1 * | 11/2014 | Kurashige et al. | 353/38 |

FOREIGN PATENT DOCUMENTS

| | | |
|---|---|---|
| JP | 06-208089 A1 | 7/1994 |
| JP | 2004-264512 A1 | 9/2004 |
| JP | 2006-047601 A1 | 2/2006 |
| JP | 2007-017536 A1 | 1/2007 |
| JP | 2007-334137 A1 | 12/2007 |
| JP | 2008-165058 A1 | 7/2008 |
| JP | 2008-250308 A1 | 10/2008 |
| JP | 2008-268878 A1 | 11/2008 |
| JP | 2009-163901 A1 | 7/2009 |
| JP | 2009-294249 A1 | 12/2009 |
| JP | 2010-181734 A1 | 8/2010 |
| JP | 4688980 B1 | 5/2011 |
| WO | 96/07953 A1 | 3/1996 |
| WO | 01/81996 A1 | 11/2001 |
| WO | 02/075433 A2 | 9/2002 |
| WO | 2006/137326 A1 | 12/2006 |
| WO | 2010/028185 A2 | 3/2010 |

OTHER PUBLICATIONS

Extended European Search Report (Application No. 11823652.0) dated Mar. 3, 2014.
Partial European Search Report (Application No. 13002139.7) dated Mar. 3, 2014.
Joseph W. Goodman, "Speckle Phenomena in Optics Theory and Applications," Chapter 6, Speckle in Certain Imaging Applications, Roberts & Co., 2006, pp. 187-233.
International Search Report dated Oct. 18, 2011 (with English translation).
International Preliminary Report on Patentability dated Nov. 1, 2012.

* cited by examiner

ILLUMINATION DEVICE, PROJECTION DEVICE, AND PROJECTION-TYPE IMAGE DISPLAY DEVICE

BACKGROUND OF THE INVENTION

1. Field of the Invention

The present invention relates to an illumination device which illuminates an illuminated zone with a coherent light beam, a projection device which projects a coherent light beam, a projection-type image display device which displays an image by using a coherent light beam, and more particularly, an illumination device, a projection device, and a projection-type image display device capable of allowing occurrence of speckles to be inconspicuous.

2. Description of Related Art

A projection-type image display device including a screen and a projection device which projects an image light beam on the screen has been widely used. In a typical projection-type image display device, a two-dimensional image as a original image is generated by using a spatial light modulator such as a liquid crystal micro display or a DMD (digital micromirror device), and the two-dimensional image is magnified and projected on a screen by using a projection optical system, so that an image is displayed on the screen.

As the projection device, various types including a commercialized product called an "optical type projector" have been proposed. In a general optical type projector, the spatial light modulator such as a liquid crystal display is illuminated by using an illumination device including a white light source such as a high pressure mercury lamp, and an obtained modulation image is magnified and projected on the screen by using lenses. For example, JP2004-264512A discloses a technique where a white light beam generated by a supper-high pressure mercury lamp is divided into three primary color components R, G, and B by a dichroic mirror, the light beams are guided by spatial light modulators corresponding to the primary colors, generated modulation images corresponding to the primary colors are combined by a cross dichroic prism to be projected on the screen.

However, a high intensity discharge lamp such as a high pressure mercury lamp has a relatively short lifecycle, and in the case where the lamp is used for an optical type projector or the like, the lamp needs to be frequently replaced. In addition, since a relatively large optical system such as a dichroic mirror is needed in order to extract the light beams of the primary color components, there is a problem in that the size of the whole device becomes large.

In order to cope with this problem, a type using a coherent light source such as a laser is also proposed. For example, a semiconductor laser which is widely used in industries has a very long lifecycle in comparison with the high intensity discharge lamp such as a high pressure mercury lamp. In addition, since the laser source is a light source capable of generating light having a single wavelength, a spectroscopic device such as a dichroic mirror is unnecessary, so that there is an advantage in that the whole device can be miniaturized.

On the other hand, in the type using the coherent light source such as a laser source, there is another problem in that speckles occur. The speckle is a punctate pattern which occurs when the coherent light beam such as a laser beam is irradiated on a scattering surface. If the speckle occurs on the screen, it is observed as punctate luminance unevenness (brightness unevenness), so that it becomes a factor of exerting physiological bad influence on the observer. The reason why the speckles occur in the case of using the coherent light beam is that the coherent light beams reflected from portions of the scattering reflection surface such as a screen have very high coherency, and the speckles are generated through interference therebetween. For example, in a literature "Speckle Phenomena in Optics, Joseph W. Goodman, Roberts & Co. 2006", theoretical review of the occurrence of speckles is made in detail.

In the type of using the coherent light source, since there is an intrinsic problem in that the speckles occur, techniques for suppressing the occurrence of speckles have been proposed. For example, JP6-208089A discloses a technique where a scattering plate is irradiated with a laser beam, an obtained scattered light beam is guided to a spatial light modulator, and the scattering plate is driven to rotate by a motor, so that speckles are reduced.

With respect to the projection device and the projection-type image display device using the coherent light source, the techniques for reducing speckles which have been proposed up to now as described above, may not effectively and sufficiently suppress the speckles. For example, in the method disclosed in JP6-208089A described above, since the laser beams irradiated on the scattering plate are scattered, a portion of the laser beams are lost without contribution to image display. In addition, although the scattering plate needs to be rotated in order to reduce the speckles, the mechanical rotation mechanism becomes a relatively large device, and the power consumption is increased. Moreover, although the scattering plate is rotated, the position of the optical axis of the illumination light beam is not changed, so that the speckles occurring on the screen due to the diffusion may not be sufficiently suppressed.

In addition, the problem of speckles is not a problem peculiar to only the projection device or the projection-type image display device, but the speckles cause a problem in various devices combined with an illumination device which illuminates an illuminated zone with a coherent light beam.

By the way, stereoscopic display, this is, 3D display by using a projection-type image display device has been commercially performed, for example, in a movie theater or the like. Particularly, in these days, stereoscopic display in TV used at home has drawn attentions. As a method of 3D-displaying an image, a method called an "active shutter glasses type" and a method called a "passive polarized glasses type" have been practically provided in the related art.

In the "active shutter glasses type", right-eye images and left-eye images are displayed in a time vision manner, and an observer wears dedicated glasses which are opened and closed corresponding to time-divisionally displayed images to observe the images. In other words, during the displaying of the right-eye image, the dedicated glasses open a right-eye window (right-eye lens inserted portion of generally-called glasses) so as to enable right-eye observation and close a left-eye window so as to disable left-eye observation. Similarly, during the displaying of the left-eye image, the dedicated glasses open the left-eye window so as to enable left-eye observation and close the right-eye window so as to disable right-eye observation. In general, the opening and closing of each window of the dedicated glasses are performed by a so-called liquid crystal panel combined to the dedicated glasses. Accordingly, in the "active shutter glasses type", the dedicated glasses become expensive, so that, in the case where many persons observe the image, a large number of the expensive dedicated glasses need to be prepared. In addition, since the operations of the dedicated glasses require electric power, the dedicated glasses need to be charged in advance, or the image needs to be observed in a state that the dedicated glasses are connected to power supply.

On the other hand, in the "passive polarized glasses type", the right-eye images and the left-eye images are displayed by using image light beams having different polarization components, and an observer wears dedicated glasses where a polarizing plate which selective transmits right-eye image light beams is attached to a right-eye window and a polarizing plate which selective transmits left-eye image light beams is attached to a left-eye window to observe the images. Therefore, the dedicated glasses for the "passive polarized glasses type" become much more inexpensive than the dedicated glasses for the "active shutter glasses type", and the electric power is unnecessary. However, in the case where the "passive polarized glasses type" is employed as a projection-type image display device, it is necessary to prevent a polarization state of the image light beam on a projection surface (for example, a screen) from being irregularly disturbed. In other words, in some cases, the "passive polarized glasses type" may not be employed according to properties of the projection surface.

In addition, polarization of a laser beam which is oscillated from a laser source can be allowed to be uniform. Therefore, in the case of employing the "passive polarized glasses type", although the laser beam may be expected to be used as an image light beam, in the case where the laser beam is used as an image light beam, the above-described problem of speckles occurs.

SUMMARY OF THE INVENTION

The present invention is to provide a projection device and a projection-type display device appropriate to stereoscopic display (3D display) and a projection device and a projection-type display device capable of allowing speckles to be inconspicuous, considering the aforementioned points. The present invention is also to provide an illumination device which is very appropriately used for the projection device and the projection-type image display device.

According to the present invention, there is provided a first illumination device, which is an illumination device illuminating an illuminated zone, including: an optical element including a hologram recording medium which includes a first zone and a second zone, and which can reproduce an image of a scattering plate; an irradiation device configured to irradiate the optical element with a coherent light beam such that the coherent light beam is allowed to scan the first zone and the second zone of the hologram recording medium; and a polarization control unit provided on an optical path of the coherent light beam to the illuminated zone, the polarization control unit being configured to control polarization of the coherent light beam such that a coherent light beam incident on the first zone of the hologram recording medium to travel toward the illuminated zone has a first polarization component and such that a coherent light beam incident on the second zone of the hologram recording medium to travel toward the illuminated zone has a second polarization component different from the first polarization component, wherein the irradiation device and the optical element are arranged such that the coherent light beams incident from the irradiation device to respective positions in the first zone of the hologram recording medium are allowed to reproduce the images superimposed on the illuminated zone and such that the coherent light beams incident from the irradiation device to respective positions in the second zone of the hologram recording medium are allowed to reproduce the images superimposed on the illuminated zone.

According to the present invention, there is provided a second illumination device including: an optical element including a hologram recording medium including a first zone and a second zone; an irradiation device configured to irradiate the optical element with a coherent light beams such that the coherent light beams is allowed to scan the first zone and the second zone of the hologram recording medium and such that the coherent light beams incident from the irradiation device on respective positions in the first zone and the second zone of the hologram recording medium are diffracted by the hologram recording medium so as to illuminate zones which overlap each other in at least a portion thereof with the coherent light beams; and a polarization control unit which is provided on an optical path of the coherent light beams and which is configured to control polarizations of the coherent light beams such that the coherent light beams incident on the first zone of the hologram recording medium to travel toward a designated illumination zone has a first polarization component and such that the coherent light beams incident on the second zone of the hologram recording medium to travel toward a designated illumination zone has a second polarization component different from the first polarization component.

In the first or second illumination device according to the present invention, the hologram recording medium may further include an intermediate zone located between the first zone and the second zone, and a light absorption body which absorbs the coherent light beam may be provided on an optical path of the coherent light beam traveling toward the intermediate zone or on an optical path of the coherent light beam traveling toward the illuminated zone after incidence on the intermediate zone.

In the first or second illumination device according to the present invention, the hologram recording medium may further include an intermediate zone located between the first zone and the second zone, and the irradiation device may intermittently irradiate with the coherent light beams so that the coherent light beams are incident on the first zone and the second zone but not incident on the intermediate zone.

According to the present invention, there is provided a third illumination device, which is an illumination device illuminating an illuminated zone, including: an optical element including a light diffusion element which includes a first zone and a second zone, and which changes a traveling direction of an incident light beam; an irradiation device configured to irradiate the optical element with a coherent light beam such that the coherent light beam is allowed to scan the first zone and the second zone of the light diffusion element; and a polarization control unit provided on an optical path of the coherent light beam to the illuminated zone, the polarization control unit being configured to control polarization of the coherent light beams such that the coherent light beam incident on the first zone of the light diffusion element to travel toward the illuminated zone has a first polarization component and such that the coherent light beam incident on the second zone of the light diffusion element to travel toward the illuminated zone has a second polarization component different from a first polarization component, wherein the irradiation device and the optical element are arranged such that traveling directions of the coherent light beams incident from the irradiation device on respective positions in the first zone of the light diffusion element are changed by the light diffusion element to illuminate the illuminated zone with the coherent light beams and such that traveling directions of the coherent light beams incident from the irradiation device on respective positions in the second zone of the light diffusion element are changed by the light diffusion element to illuminate the illuminated zone with the coherent light beams.

According to the present invention, there is provided a fourth illumination device including: an optical element including a light diffusion element which includes a first zone and a second zone to change a traveling direction of an incident light beam; an irradiation device configured to irradiate the optical element with a coherent light beam such that the coherent light beam is allowed to scan the first zone and the second zone of the light diffusion element and such that the traveling directions of the coherent light beams incident from the irradiation device on respective positions in the first zone and the second zone of the light diffusion element are changed by the light diffusion element so as to illuminate zones which overlap each other in at least a portion thereof with the coherent light beams; and a polarization control unit provided on an optical path of the coherent light beams, the polarization control unit being configured to control polarization of the coherent light beams such that a coherent light beam incident on the first zone of the light diffusion element to travel toward a designated illumination zone has a first polarization component and such that a coherent light beam incident on the second zone of the light diffusion element to travel toward a designated illumination zone has a second polarization component different from the first polarization component.

In the third or fourth illumination device according to the present invention, the light diffusion element may further include an intermediate zone located between the first zone and the second zone, and a light absorption body which absorbs the coherent light beam may be provided on an optical path of the coherent light beam traveling toward the intermediate zone or on an optical path of the coherent light beam traveling toward the illuminated zone after incidence on the intermediate zone.

In the third or fourth illumination device according to the present invention, the light diffusion element may further include an intermediate zone located between the first zone and the second zone, and the irradiation device may intermittently irradiate with the coherent light beams so that the coherent light beams are incident on the first zone and the second zone but not incident on the intermediate zone.

In the third or fourth illumination device according to the present invention, the light diffusion element may be a lens array.

According to the present invention, there is provided a fifth illumination device which illuminates an illuminated zone in a time division manner with a coherent light beam configured with a first polarization component and a coherent light beam configured with a second polarization component different from the first polarization component.

In any one of the first to fifth illumination devices according to the present invention, one of the first polarization component and the second polarization component may be a right circularly-polarized light beam or a right elliptically-polarized light beam, and the other of the first polarization component and the second polarization component may be a left circularly-polarized light beam and a left elliptically-polarized light beam. In addition, in any one of the first to fifth illumination devices according to the present invention, one of the first polarization component and the second polarization component may be a linearly-polarized light beam which vibrates in one direction, and the other of the first polarization component and the second polarization component is linearly-polarized light beam which vibrates in the other direction perpendicular to the one direction.

In any one of the first to fifth illumination devices according to the present invention, the polarization control unit may be configured to include a polarization control element which is laminated on the optical element and which is configured to control the polarization of the coherent light beam.

In any one of the first to fifth illumination devices according to the present invention, the irradiation device may be configured to include: a light source which generates the coherent light beam; and a scan device configured to change a traveling direction of the coherent light beam from the light source so as to allow the coherent light beam to scan the optical element, and the polarization control unit may include a polarization control element which is arranged between the scan device and the optical element on an optical element of the coherent light beam and which controls polarization of the coherent light beam.

In any one of the first to fifth illumination devices according to the present invention, the irradiation device may include a light source which generates the coherent light beam, and the light source may be configured to generate a linearly-polarized light beam of which vibration direction is a certain direction. In any one of the first to fifth illumination devices according to the present invention, the polarization control unit may include a ½ wave plate which is provided on an optical path of the coherent light beam incident on the one of the first zone and the second zone to travel toward the illuminated zone. In addition, in any one of the first to fifth illumination devices according to the present invention, the polarization control unit may further include a ¼ wave plate which is provided on an optical path of the coherent light beam incident on the first zone and the second zone to travel toward the illuminated zone.

In any one of the first to fifth illumination devices according to the present invention, the irradiation device may include a light source which generates the coherent light beam, and the light source may be configured to generate a circularly-polarized light beam or an elliptically-polarized light beam of which circulation direction is a certain direction. In any one of the first to fifth illumination devices according to the present invention, the polarization control unit may be configured to include a ½ wave plate which is provided on an optical path of the coherent light beam incident on the one of the first zone and the second zone to travel toward the illuminated zone so that polarization of the coherent light beam incident on the other of the first zone and the second zone to travel toward the illuminated zone is maintained.

In any one of the first to fifth illumination devices according to the present invention, the irradiation device includes a light source which generate a non-polarized coherent light beam, and the polarization control unit may be configured to include a first polarizing plate which is provided on an optical path of the coherent light beam incident on the first zone to travel toward the illuminated zone and selectively transmits the first polarization component and a second polarizing plate which is provided on an optical path of the coherent light beam incident on the second zone to travel toward the illuminated zone and selectively transmits the second polarization component.

According to the present invention, there is provided a projection device including: any one of the first to fifth illumination devices according to the present invention; and a spatial light modulator positioned at a position which overlaps the illuminated zone and which is illuminated by the illumination device, wherein the spatial light modulator forms a first modulation image corresponding to the coherent light beam having the first polarization component and a second modulation image corresponding to the coherent light beam having the second polarization component in a time division manner.

The projection device according to the present invention may be configured to further include a projection optical system configured to project a modulation image obtained on the spatial light modulator on a screen.

According to the present invention, there is provided a projection-type image display device including: any one of the projection devices according to the present invention; and a screen on which a modulation image obtained on the spatial light modulator is projected.

According to the present invention, it is possible to effectively allow speckles in an illuminated zone or an image projection surface to be inconspicuous. In addition, according to the present invention, it is possible to illuminate an illuminated zone with coherent light beams having different polarization components in a time division manner. Therefore, according to a projection device and a projection-type image display device using the illumination device, it is possible to display an image formed with image light beams having different polarization components in a time division manner while it is possible to effectively allow the speckles in the image projection surface to be inconspicuous. Therefore, it is possible to display a image which can be stereoscopically observed, for example, by any one of dedicated glasses for a "active shutter glasses type" and dedicated glasses for a "passive polarized glasses type" while effectively allowing the speckles to be inconspicuous.

DETAILED DESCRIPTION OF THE INVENTION

Figure 1:
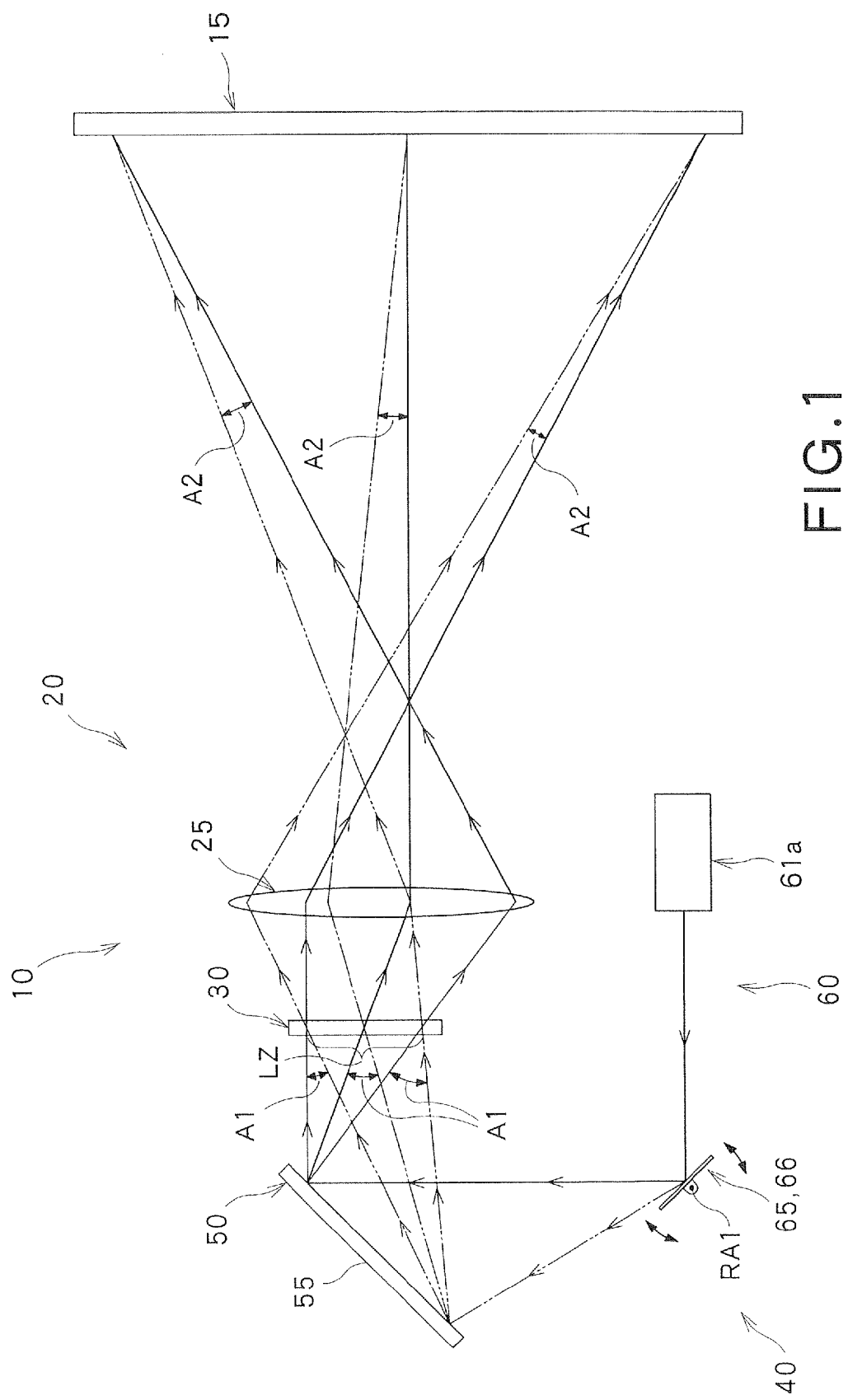
FIG. 1 is a diagram illustrating a basic form according to an embodiment of the present invention and illustrating schematic configurations of an illumination device, a projection device, and a projection-type image display device as a specific example of the basic form.

Hereinafter, embodiments of the present invention will be described with reference to the drawings. In addition, in the drawings attached to the specification, for the better understanding and the convenience of illumination, reduction scales, aspect ratios, and the like are exaggerated differently from those of real objects.

An illumination device, a projection device, and a projection-type image display device according to the embodiments of the present invention have a basic configuration capable of effectively preventing speckles from occurring. In addition, the illumination device, the projection device, and the projection-type image display device according to the embodiment also have a basic configuration capable of effectively preventing speckles and an applied configuration for displaying an image (3D image) which is to be stereoscopically observed.

In the description hereinafter, first, a configuration which is capable of allowing speckles to be inconspicuous, functions and effects which can be obtained based on the configuration, and modified forms of the configuration will be described as a basic embodiment with reference to a projection-type image display device including an illumination device and projection device illustrated in FIGS. 1 to 7. Next, a configuration which is an applied configuration of the basic embodiment and is capable of allowing an image (3D image) which is to be stereoscopically observed to be displayed, functions and effects of can be obtained based on the configuration, and modified forms of the configuration will be described as an applied form.

Basic Embodiment

[Configuration of Basic Embodiment]

First, a configuration of a projection-type image display device which includes an illumination device and a projection device projecting a coherent light beam and is capable of allowing speckles to be inconspicuous will be described mainly with reference to FIGS. 1 to 7.

The projection-type image display device 10 illustrated in FIG. 1 is configured to include a screen 15 and a projection device 20 which projects image light beams which includes coherent light beams. The projection device 20 is configured to include an illumination device 40 which illuminates an illuminated zone LZ located on a virtual plane with the coherent light beams, a spatial light modulator 30 which is disposed at a position overlapping the illuminated zone LZ and is illuminated with the coherent light beams by the illumination device 40, and a projection optical system 25 which projects the coherent light beams from the spatial light modulator 30 on the screen 15.

The spatial light modulator 30 is illuminated in a planar shape by the illumination device 40, so that a modulation image is formed. The modulation image (image light beam) formed by the spatial light modulator 30 is projected on the screen 15 with equal or changed magnification by projection optical system 25. Therefore, the modulation image is displayed on the screen 15 with equal or changed magnification (generally, enlargement), so that an observer can observe the image.

A well-known transmission-type spatial light modulator (transmission-type microdisplay) and an well-known reflection-type spatial light modulator (reflection-type microdisplay) may be used as the spatial light modulator 30. Even in the case where any one of the well-known spatial light modulators is used as the spatial light modulator 30 described in the basic embodiment, as described below, it is possible to allow speckles to be inconspicuous. However, in the case where an image (3D image) which is to be stereoscopically observed is enabled to be displayed by any one of a "active shutter glasses type" and a "passive polarized glasses type" based on the applied form described below, it is preferable that the spatial light modulator 30 do not disturb the polarization of a coherent light beam from the illumination device 40 to be in disorder but it maintains the polarization of the coherent light beam of the illumination device 40.

As a specific example, similarly to JP 6-208089 A, a MEMS element such as a DMD (Digital Micromirror Device) may also be used as the spatial light modulator 30. The MEMS element such as DMD is a reflection-type microdisplay. In the reflection-type microdisplay, a modulation image is formed by a reflected light beams from the spatial light modulator 30, and a plane which is irradiated with the coherent light beam from the illumination device 40 to the spatial light modulator 30 and a plane from which image light beams constituting the modulation image from the spatial light modulator 30 progress out as the same plane. However, in the configuration illustrated, for the convenience of the understanding, an example where the spatial light modulator 30 is configured with a transmission-type microdisplay is illustrated.

In addition, it is preferable that the incidence surface of the spatial light modulator 30 has the same shape and size as those of the illuminated zone LZ which is illuminated with the coherent light beams by the illumination device 40. This is because, in this case, the coherent light beams from the illumination device 40 can be used to display an image on the screen 15 with high use efficiency.

The screen 15 may be configured as a transmission-type screen or maybe configured as a reflection-type screen. In the case where the screen 15 is configured as a reflection-type screen, an observer observes an image displayed by the coherent light beams reflected by the screen 15 from the same side as the projection device 20 with respect to the screen 15. On the other hand, in the case where the screen 15 is configured as a transmission-type screen, an observer observes an image displayed by the coherent light beams passing through the screen 15 from the side opposite to the projection device 20 with respect to the screen 15.

A well-known transmission-type screen and a well-known reflection-type screen may be used as the screen 15. Even in the case where any one of the well-known screens is used as the screen 15 described in the basic embodiment, as described below, it is possible to allow speckles to be inconspicuous. However, in the case where an image (3D image) which is to be stereoscopically observed is enabled to be displayed by a "passive polarized glasses type" as well as a "active shutter glasses type" based on the applied form described below, it is preferable that the screen 15 do not disturb the polarization of a coherent light beam (image light beam) projected from the projection device 20 to be in disorder but it maintains the polarization of the coherent light beam of the projection device 20.

The coherent light beams projected on the screen 15 are diffused to be recognized as an image by the observer. At this time, the coherent light beams projected on the screen interfere due to the diffusion thereof, so that speckles occur. However, in the projection-type image display device 10 described herein, since the illumination device 40 described hereinafter is configured to illuminate the illuminated zone LZ, which overlaps the spatial light modulator 30, with the coherent light beams of which incident angles are changed temporally. More specifically, although the illumination device 40 described hereinafter illuminates the illuminated zone LZ with diffused light beams including the coherent light beams, the incident angles of the diffused light beams is changed temporally. As a result, the diffusion pattern of the coherent light beams on the screen 15 is also changed with time, and the speckles occurring due to the diffusion of the coherent light beams are superimposed temporally, so that the speckles are inconspicuous. Hereinafter, the illumination device 40 will be described more in detail.

Figure 2:
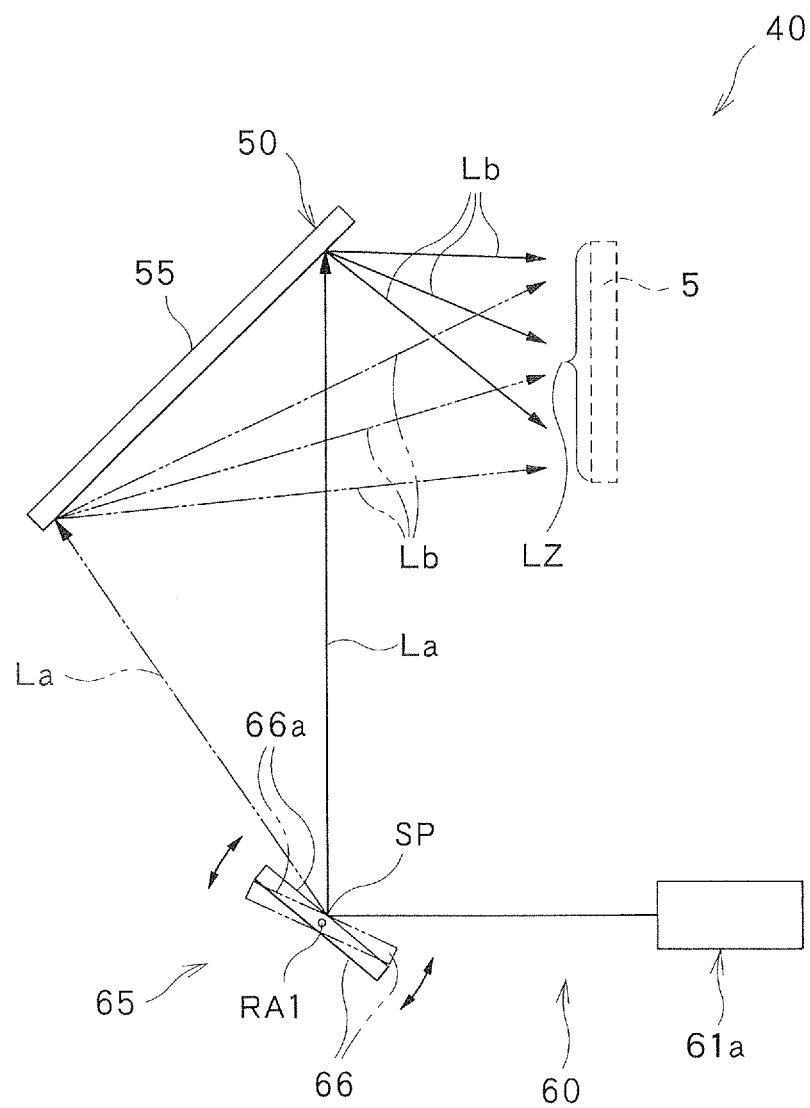
FIG. 2 is a diagram illustrating the illumination device illustrated in FIG. 1.

The illumination device 40 illustrated in FIGS. 1 and 2 is configured to include an optical element 50 which directs the traveling directions of the coherent light beams to the illuminated zone LZ and an irradiation device 60 which irradiates the optical element 50 with the coherent light beams. The optical element 50 includes a hologram recording medium 55 which functions as a light diffusion element or a light diffusion component, particularly, a hologram recording medium 55 which can reproduce an image 5 of a scattering plate 6. In the example illustrated, the optical element 50 is made of the hologram recording medium 55.

In the example illustrated, the hologram recording medium 55 constituting the optical element 50 receives the coherent light beams irradiated from the irradiation device 60 as reproduction illumination light beams La to diffract the coherent light beams with high efficiency. Particularly, the hologram recording medium 55 diffracts each coherent light beam which is incident on each position, that is, each micro zone which is to be called each point, so that the image 5 of the scattering plate 6 can be reproduced.

On the other hand, the irradiation device 60 irradiates the optical element 50 with the coherent light beams so that the coherent light beams scan the hologram recording medium 55 of the optical element 50. Therefore, at some instance, a zone of the hologram recording medium 55 irradiated with the coherent light beams by the irradiation device 60 is a portion of the surface of the hologram recording medium 55. Particularly, in the example illustrated, the zone is a micro zone which is to be called a point.

The coherent light beams which are irradiated from the irradiation device 60 to scan the hologram recording medium 55 are incident on respective positions (respective points or respective zones (same as hereinafter)) on the hologram recording medium 55 with incident angles satisfying a diffraction condition of the hologram recording medium 55. The coherent light beams which are incident from the irradiation device 60 on the respective positions of the hologram recording medium 55 are diffracted by the hologram recording medium 55, so that the zones which overlap each other in at least a portion thereof are illuminated with the coherent light beams. Particularly, in the embodiment described herein, the coherent light beams which are incident from the irradiation device 60 on the respective positions of the hologram recording medium 55 are diffracted by the hologram recording medium 55, so that the same illuminated zone LZ is illuminated with the coherent light beams. More specifically, as illustrated in FIG. 2, the coherent light beams which are incident from the irradiation device 60 on the respective positions of the hologram recording medium 55 reproduce the image 5 of the scattering plate 6 such that the reproduced images 5 of the scattering plate 6 overlap on the illuminated zone LZ. In other words, the coherent light beams which are incident from the irradiation device 60 on the respective positions of the hologram recording medium 55 are diffused (spread) by the optical element 50 to be incident on the illuminated zone LZ.

Figure 3:
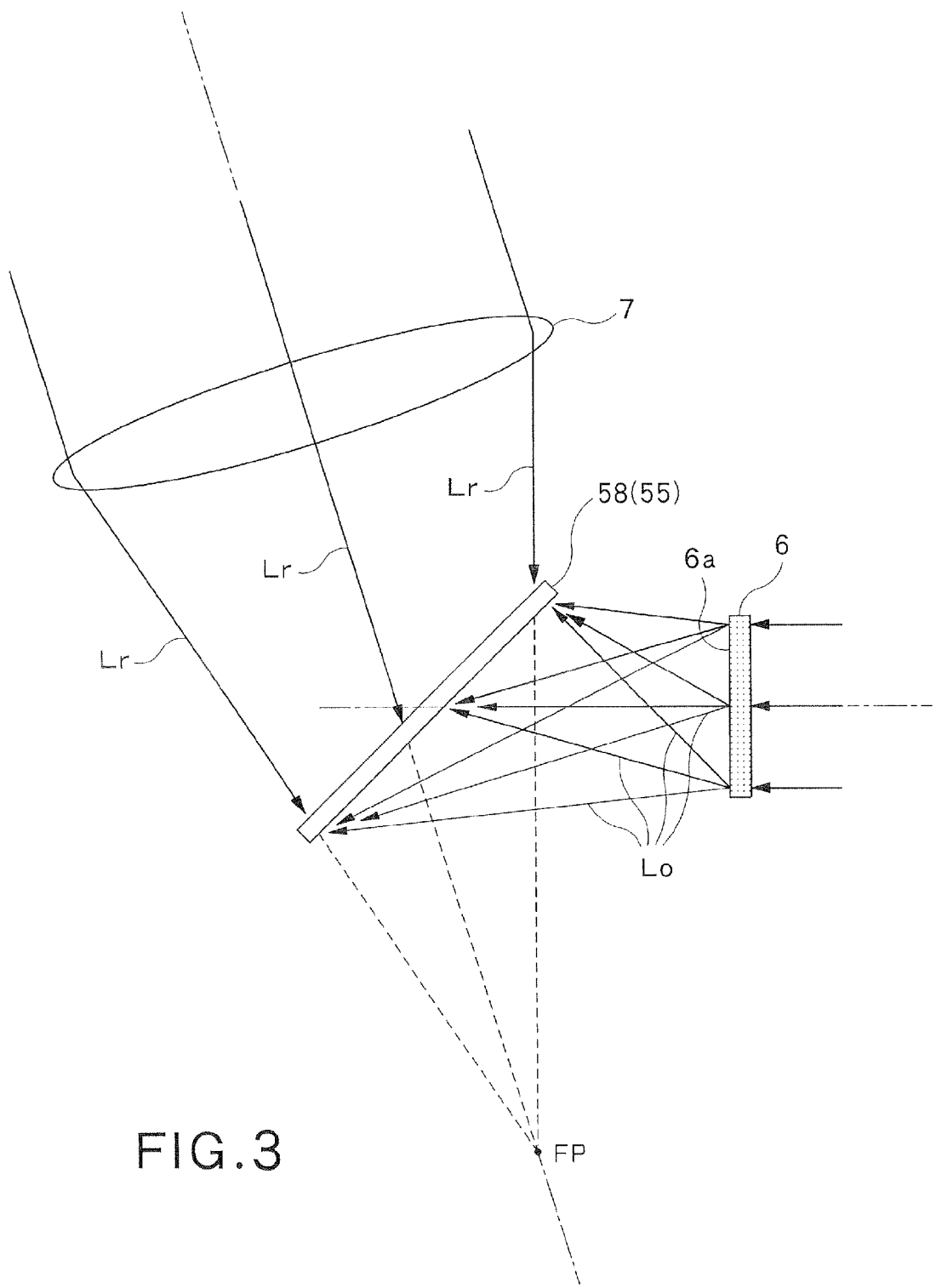
FIG. 3 is a diagram illustrating an exposure method for manufacturing a hologram recording medium constituting optical elements of the illumination device illustrated in FIG. 2.

In the example illustrated, a reflection-type volume hologram using a photopolymer is used as the hologram recording medium 55 which enables the above diffraction function of the coherent light beams. As illustrated in FIG. 3, the hologram recording medium 55 is manufactured by using scattered light beams from the scattering plate 6 as object light beams Lo. FIG. 3 illustrates a state where a hologram photosensitive material 58 having photosensitivity which is to be constitute the hologram recording medium 55 is exposed by the reference light beams Lr and object light beams Lo which are the coherent light beams having mutual coherency.

For example, laser beams of the laser source which oscillates laser beams in a specific wavelength range are used as the reference light beams Lr, and the reference light beams Lr pass through a light collection element 7 including lenses to be incident on the hologram photosensitive material 58. In the example illustrated in FIG. 3, the laser beams constituting the reference light beams Lr are incident on the light collection element 7 as a parallel light flux which is parallel to an optical axis of the light collection element 7. The reference light beams Lr pass through the light collection element 7, so that the reference light beams Lr are shaped (transformed) from the parallel light flux to a converging light flux to be incident on the hologram photosensitive material 58. At this time, the focal point FP of the converging light flux Lr is located beyond the hologram photosensitive material 58. In other words, the hologram photosensitive material 58 is disposed between the light collection element 7 and the focal point FP of the converging light flux Lr which is condensed by the light collection element 7.

The object light beams Lo as the scattered light beams from the scattering plate 6 made of, for example, an opal glass are incident on the hologram photosensitive material 58. Since the hologram recording medium 55 which is to be manufactured herein is a reflection-type, the object light beams Lo are incident from the plane of the side opposite to the reference light beams Lr on the hologram photosensitive material 58. The object light beams Lo need to have coherency with the reference light beams Lr. Therefore, for example, a laser beam oscillated from the same laser source may be divided, one of the divided beams may be used as the reference light beam Lr, and the other may be used as the object light beam Lo.

In the example illustrated in FIG. 3, the parallel light flux which is parallel to the normal direction of the plate plane of the scattering plate 6 is incident on the scattering plate 6 to be scattered, and the scattered light beams passing through the scattering plate 6 are incident as the object light beams Lo on the hologram photosensitive material 58. According to this method, in the case where an isotropic scattering plate which is generally available at low cost is used as the scattering plate 6, the object light beams Lo from the scattering plate 6 can be incident on the hologram photosensitive material 58 with a substantially uniform light amount distribution. In addition, according to this method, although the light amount distribution depends on the degree of scattering of the scattering plate 6, the reference light beams Lr are easily incident from the entire area of the light emitting surface 6a of the scattering plate 6 to the positions of the hologram photosensitive material 58 with a substantially uniform light amount. In this case, due to the light beams which are incident on the respective positions of the hologram recording medium 55 obtained, it is possible to implement reproduction of the image 5 of the scattering plate 6 with the same brightness and observation of the reproduced image 5 of the scattering plate 6 with substantially uniform brightness.

In this manner, if the hologram recording material 58 is exposed by the reference light beams Lr and the object light beams Lo, interference fringe is generated by interference between the reference light beams Lr and the object light beams Lo, and the interference fringe of these light beams is recorded in the hologram recording material 58 as some pattern (for example, in the case of a volume hologram, a refractive index modulation pattern). Next, appropriate post processes corresponding to the type of the hologram recording material 58 are performed, so that the hologram recording material 55 is obtained.

Figure 4:
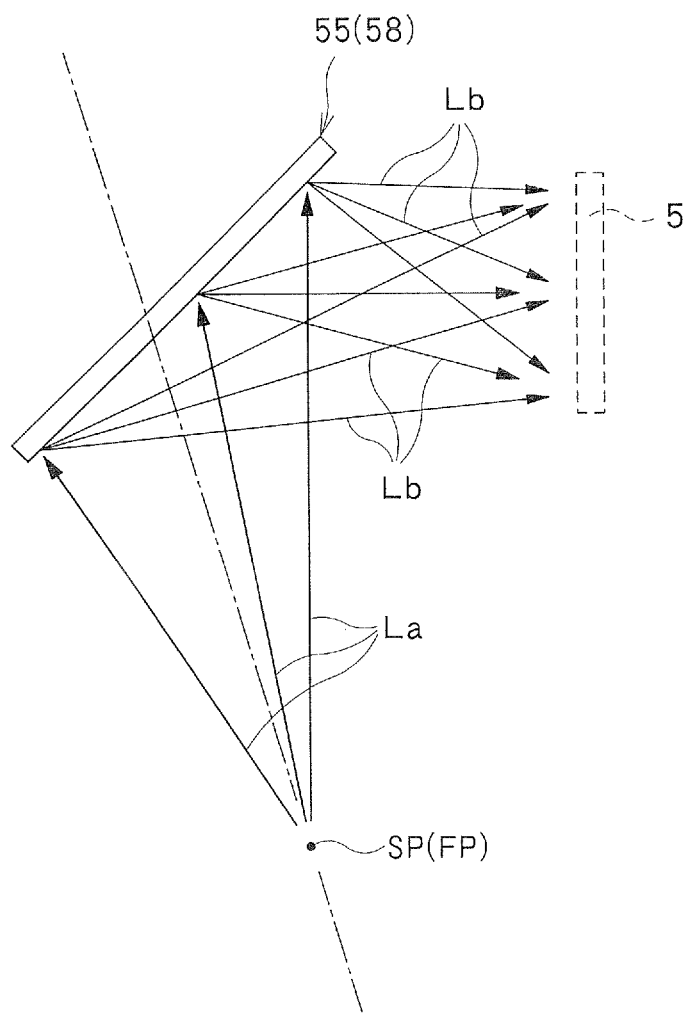
FIG. 4 is a diagram illustrating functions of a hologram recording medium manufactured through the exposure method illustrated in FIG. 3.

FIG. 4 illustrates a diffraction function (reproduction function) of the hologram recording medium 55 obtained through the exposing process of FIG. 3. As illustrated in FIG. 4, with respect to the hologram recording medium 55 formed from the hologram photosensitive material 58 of FIG. 3, the light beams having the same wavelength as that of the laser beam used for the exposing process, which travel in the reverse direction along the optical path of the reference light beams Lr in the exposing process, satisfy the Bragg condition. In other words, as illustrated in FIG. 4, a diverging light flux, which has the same positional relationship as the relative position (refer to FIG. 3) of the focal point FP with respect to the hologram photosensitive material 58 during the exposing process to diverge from a standard point SP located with respect to the hologram recording medium 55 and has the same wavelength as that of the reference light beams Lr during the exposing process, is diffracted as the reproduction illumination light beams La to the hologram recording medium 55, so that the reproduced image 5 of the scattering plate 6 is generated at a specific position with respect to the hologram recording medium 50 which has the same positional relationship as the relative position (refer to FIG. 3) of the scattering plate 6 with respect to the hologram photosensitive material 58 during the exposing process.

At this time, reproduction light beams (light beams obtained by diffracting the reproduction illumination light beams La with the hologram recording medium 55) Lb which reproduce respective points of the image 5 of the scattering plate 6 as light beams which travel in the reverse direction along the optical path of the object light beams Lo which travel from the scattering plate 6 toward the hologram photosensitive material 58 during the exposing process. In addition, as described above, as illustrated in FIG. 3, the scattered light beams Lo which emit from the positions of the light emitting surface 6a of the scattering plate 6 during the exposing process are diffused (spread) so as to be incident on the substantially entire area of the hologram photosensitive material 58. In other words, the object light beams Lo from the entire area of the light emitting surface 6a of the scattering plate 6 are incident on the respective positions on the hologram photosensitive material 58, so that information of the entire light emitting surface 6a is recorded in the respective positions of the hologram recording medium 55. Therefore, the light beams constituting the diverging light flux from the standard point SP which function as the reproduction illumination light beams La illustrated in FIG. 4 are individually incident on the respective positions of the hologram recording medium 55, so that the images 5 of the scattering plate 6 having mutually the same contour can be reproduced at mutually the same positions (illuminated zone LZ).

On the other hand, the irradiation device 60 which irradiates the optical element 50 including the hologram recording medium 55 with the coherent light beams may be configured as follows. In the example illustrated in FIGS. 1 and 2, the irradiation device 60 is configured to include a laser source 61a which generates coherent light beams of a specific wavelength range and a scan device 65 which changes traveling directions of the coherent light beams from the laser source 61a. The scan device 65 changes the traveling directions of the coherent light beams with time, so that the traveling directions of the coherent light beams are not a certain direction but various directions. As a result, the coherent light beams of which the traveling directions are changed by the scan device 65 are allowed to scan the incidence surface of the hologram recording medium 55 of the optical element 50.

Figure 5:
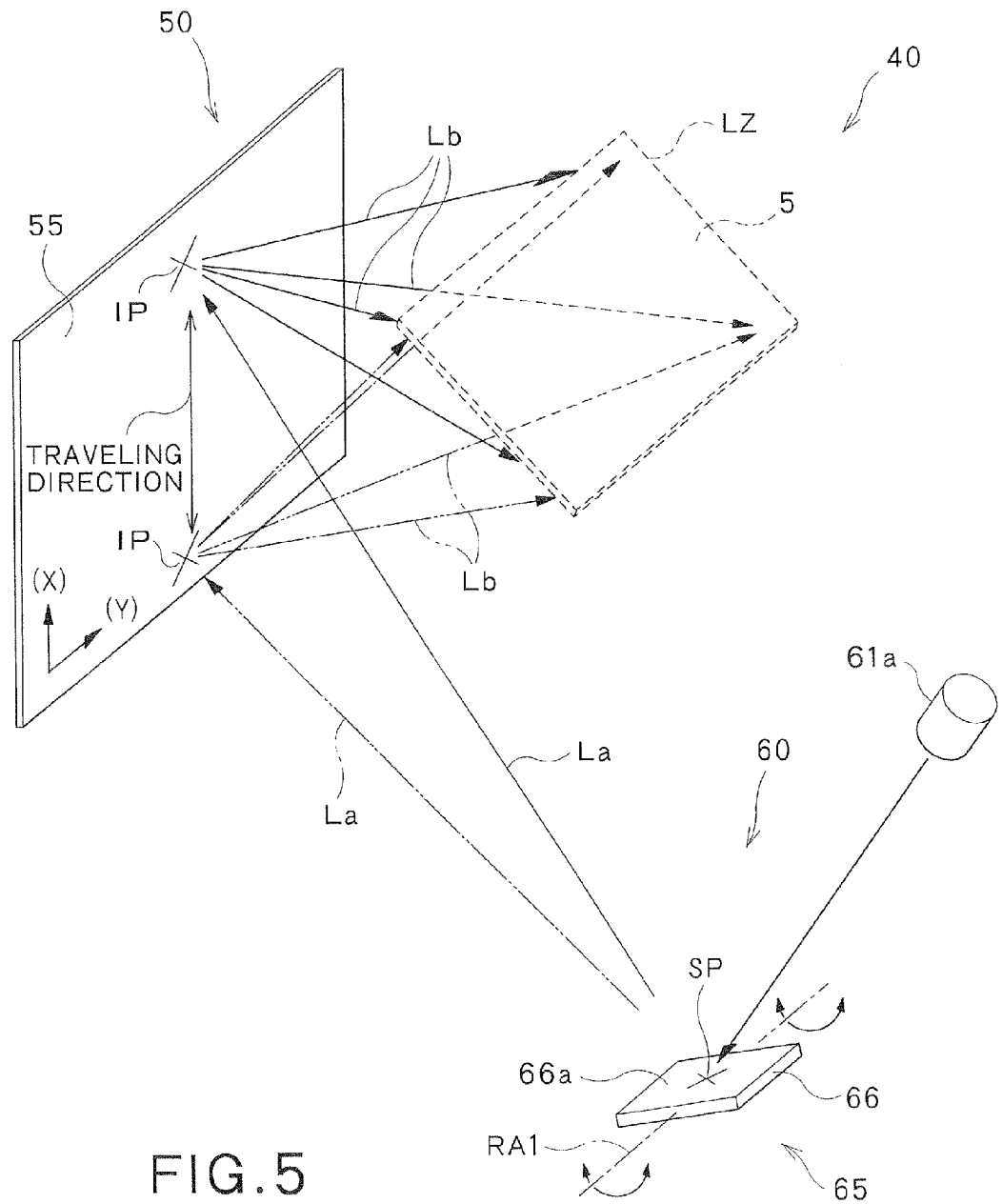
FIG. 5 is a perspective diagram illustrating functions of the illumination device illustrated in FIG. 1.

Particularly, in the example illustrated in FIG. 2, the scan device 65 is configured to include a reflection device 66 having a reflection surface 66a which can rotate about one axial line RA1. More specifically, the reflection device 66 is configured as a mirror device having a mirror as the reflection surface 66a which can rotate about the one axial line RA1. In addition, as illustrated in FIGS. 2 and 5, the mirror device 66 changes the traveling directions of the coherent light beams from the laser source 61a by changing the orientation of the mirror 66a. At this time, as illustrated in FIG. 2, the mirror device 66 substantially receives the coherent light beams from the laser source 61a at the standard point SP. Therefore, the coherent light beam of which traveling direction is finally adjusted by the mirror device 66 can be incident on the hologram recording medium 55 of the optical element 50 as the reproduction illumination light beam La (refer to FIG. 4) which can constitute one light ray of the diverging light flux from the standard point SP. As a result, the coherent light beams of the irradiation device 60 are allowed to scan the hologram recording medium 55, and the coherent light beams which are incident on the respective positions of the hologram recording medium 55 are allowed to reproduce the image 5 of the scattering plate 6 having the same contour at the same point (illuminated zone LZ).

In addition, the mirror device 66 illustrated in FIG. 2 is configured to rotate the mirror 66a about one axial line RA1. FIG. 5 is a perspective diagram illustrating a configuration of the illumination device 40 illustrated in FIG. 2. In the example illustrated in FIG. 5, the rotation axial line RA1 of the mirror 66a is extended in parallel to the Y axis of the XY coordinate system defined on the plate plane of the hologram recording medium 55 (that is, the XY coordinate system where the XY plane is parallel to the plate plane of the hologram recording medium 55). In addition, since the mirror 66a rotates about the axial line RA1 which is parallel to the Y axis of the XY coordinate system defined on the plate plane of the hologram recording medium 55, the incident point IP of the coherent light beam from the irradiation device 60 to the optical element 50 is reciprocally moved in the direction which is parallel to the X axis of the XY coordinate system defined on the plate plane of the hologram recording medium 55. In other words, in the example illustrated in FIG. 5, the irradiation device 60 irradiates the optical element 50 with the coherent light beams so that the coherent light beams are allowed to scan the hologram recording medium 55 along the straight line path.

In addition, as a practical problem, there is a case where the hologram recording material 58 is contracted during the manufacturing of the hologram recording medium 55. In this case, by taking into consideration the contraction of the hologram recording material 58, it is preferable that the recording angles of the coherent light beam which is irradiated on the optical element 50 by the irradiation device 60 be adjusted. Therefore, the wavelength of the coherent light beam generated by the coherent light source 61a needs not to be strictly equal to, but may be substantially equal to the wavelength of the light beam used in the exposing process (recording process) of FIG. 3.

In addition, for the same reason, although the traveling direction of the light beam incident on the hologram recording medium 55 of the optical element 50 is not taken to be strictly equal to one light ray constituting the diverging light flux from the standard point SP, the image 5 can be reproduced in the illuminated zone LZ. Actually, in the example illustrated in FIGS. 2 and 5, the mirror (reflection surface) 66a of the mirror device 66 constituting the scan device 65 is necessarily shifted from the rotation axial line RA1. Therefore, in the case where the mirror 66a is allowed to rotate about the rotation axial line RA1 which does not pass through the standard point SP, the light beam incident on the hologram recording medium 55 may not be one light ray constituting the diverging light flux from the standard point SP. However, in a practical case, the coherent light beams of the irradiation device 60 having the illustrated configuration are allowed to reproduce the image 5 substantially superimposed on the illuminated zone LZ.

[Functions and Effects of Basic Embodiment]

Next, the functions of the illumination device 40, the projection device 20, and the projection-type image display device 10 having the configuration described hereinbefore will be described.

First, the irradiation device 60 allows the coherent light beams to scan the hologram recording medium 55 of the optical element 50 to irradiate the optical element 50 with the coherent light beams. More specifically, the laser source 61a generates the coherent light beams having a specific wavelength range which travel in a constant direction, and the traveling directions of the coherent light beams can be changed by the scan device 65. The scan device 65 allows the coherent light beams having a specific wavelength range to be incident on the respective positions of the hologram recording medium 55 with incident angles satisfying the Bragg condition of the positions. As a result, due to the diffraction of the hologram recording medium 55, the coherent light beams incident on the respective positions reproduce the image 5 of the scattering plate 6 such that the reproduced images 5 of the scattering plate 6 overlap on the illuminated zone LZ. In other words, the coherent light beams which are incident from the irradiation device 60 on the respective positions of the hologram recording medium 55 are diffused (spread) by the optical element 50 to be incident on the entire area of the illuminated zone LZ. In this manner, the irradiation device 60 illuminates the illuminated zone LZ with the coherent light beams.

As illustrated in FIG. 1, in the projection device 20, the spatial light modulator 30 is disposed at the position which overlaps the illuminated zone LZ of the illumination device 40. Therefore, with respect to the spatial light modulator 30, the surface thereof is illuminated by the illumination device 40, and each pixel is allowed to selectively transmit the coherent light beam, so that an image is formed. This image is projected on the screen 15 by the projection optical system 25. The coherent light beams projected on the screen 15 are diffused and recognized as an image by an observer. However, at this time, the coherent light beams projected on the screen interfere with each other due to the diffusion, so that speckles occur.

However, according to the illumination device 40 of the basic embodiment described herein, as described below, it is possible to very effectively allow the speckles to be inconspicuous.

The above-described literature "Speckle Phenomena in Optics, Joseph W. Goodman, Roberts & Co. 2006" discloses that multiplexing of parameters of polarization, phase, angle, and time and increasing of modes are effective to allow the speckles to be inconspicuous. Herein, the modes denote speckle patterns having no correlation therebetween. For example, in the case where the coherent light beams of a plurality of the laser sources are projected on the same screen in different directions, there are modes of which the number is equal to the number of the laser sources. In addition, in the case where the coherent light beams of the same laser source are projected on the screen in different directions in a time division manner, there are modes of which the number is equal to the number of times of changing of the incident direction of the coherent light beam within a time which may not be resolved by human eyes. In addition, it is considered that, in the case where a plurality of the modes exist, the interference patterns of light beams overlap each other with no correlation to be averaged, so that it is possible to allow the speckles observed with observer's eyes to be inconspicuous.

In the irradiation device 60 described above, the coherent light beams are allowed to scan the hologram recording medium 55 to be irradiated on the optical element 50. In addition, with respect to the coherent light beams which are incident from the irradiation device 60 on the respective positions of the hologram recording medium 55, although the entire area of the same illuminated zone LZ is illuminated with the coherent light beams, the illumination directions of the coherent light beams which are illuminated on the illuminated zone LZ are different from each other. In addition, since the positions of the hologram recording medium 55 where the coherent light beams are incident are changed with time, the incident directions of the coherent light beams incident on the illuminated zone LZ are also changed with time.

If the illuminated zone LZ is considered as a standard, although the coherent light beam is consistently incident on the each position inside the illuminated zone LZ, the incident direction thereof is always continuously changed as indicated by arrow A1 in FIG. 1. As a result, the light beams constituting respective pixels of the image formed by the transmitted light beams of the spatial light modulator 30 are projected on specific positions of the screen 15 while the optical path is changed with time as indicated by arrow A2 of FIG. 1.

In addition, the coherent light beams are allowed to continuously scan the hologram recording medium 55. Therefore, the incident direction of the coherent light beam incident from the irradiation device 60 on the illuminated zone LZ is also continuously changed, and the incident direction of the coherent light beam incident from the projection device 20 on the screen 15 is also continuously changed. Herein, if the incident direction of the coherent light beam incident from the projection device 20 on the screen 15 is changed by only a small amount (for example, several deci-degrees), the pattern of speckles occurring on the screen 15 is also greatly changed, so that speckle patterns having no correlation are superimposed sufficiently. In addition, the frequency of the scan device 65 such as a MEMS mirror or a polygon mirror which is actually commercially available is typically several hundred Hz or more, and in some cases, the frequency of the scan device 65 may be several tens of thousands of Hz.

Hereinbefore, according to the basic embodiment described above, the incident directions of the coherent light beams are changed temporally at the positions of the screens 15 displaying the image, and the speed of the change thereof is such a speed that the change may not be resolved by human eyes, and thus, the multiplexed scattering patterns of the coherent light beams having no correlation are observed by human eyes. Therefore, the speckles occurring corresponding to the respective scattering patterns overlap to be averaged and are observed by an observer. Therefore, with respect to the observer who observes the image displayed on the screen 15, the speckles are very effectively allowed to be inconspicuous.

In addition, with respect to the speckles observed by human in the prior art, the speckles of the screen side may occur due to the scattering of the coherent light beams on the screen 15, and the speckles of the projection device side may occur due to the scattering of the coherent light beams before projection on the screen. The speckle pattern occurring at the projection device side is projected on the screen 15 through the spatial light modulator 30, so that the speckle pattern can be recognized by the observer. However, according to the basic embodiment described above, the coherent light beams are allowed to continuously scan the hologram recording medium 55, and the coherent light beams which are incident on the respective positions of the hologram recording medium 55 illuminate on the entire area of the illuminated zone LZ in which the spatial light modulator 30 is overlapped. In other words, a new wavefront surface different from the existing wavefront surface, where the speckle pattern is formed, is formed on the hologram recording medium 55, and the screen 15 is illuminated complicatedly and uniformly through the illuminated zone LZ and the spatial light modulator 30. Due to the formation of the new wavefront surface on the hologram recording medium 55, the speckle pattern occurring at the projection device side may not be visually perceived.

The above-described literature "Speckle Phenomena in Optics, Joseph W. Goodman, Roberts & Co. 2006" discloses a method of using a numerical value called speckle contrast as a parameter indicating a degree of speckles occurring on the screen. The speckle contrast is a quantity defined as a value obtained by dividing a standard deviation of luminance difference actually occurring on a screen at the time of displaying an image of a test pattern which needs to have an originally uniform luminance distribution by an average value of luminance. As the value of speckle contrast is increased, the degree of occurrence of speckles on the screen is increased, and thus, a punctate luminance unevenness pattern is more remarkably represented to an observer.

In the projection-type image display device 10 according to the basic embodiment described with reference to FIGS. 1 to 5, the speckle contrast is measured to be 3.0% (Condition 1). In addition, in the case where, instead of the reflection-type volume hologram, a relief-type hologram which is a computer generated hologram (CGH) having a convex-concave shape designed by using a computer so as to reproduce the image 5 of the scattering plate 6 when specific reproduction illumination light beams are irradiated is used as the optical element 50 described above, the speckle contrast is measured to be 3.7% (Condition 2). In the application of HDTV (high definition TV) image display, although a criterion that the speckle contrast is 6.0% or less is set (for example, refer to WO/2001/081996) as a level that an observer may not almost recognize a luminance unevenness pattern through visual observation, the basic embodiment described above satisfies the criterion sufficiently. In addition, actually, in visual observation, luminance unevenness (brightness unevenness) to a degree that it can be visually perceived does not occur.

On the other hand, in the case where the laser beams of the laser source are shaped to be in the parallel light flux and are incident on the spatial light modulator 30, that is, in the case where the coherent light beams of the laser source 61a as the parallel light flux are incident on the spatial light modulator 30 of the projection-type image display device 10 illustrated in FIG. 1 without use of the scan device 65 or the optical element 50, the speckle contrast becomes 20.7% (Condition 3). Under the condition, the punctate luminance unevenness pattern is very conspicuously observed through visual observation.

In addition, in the case where the light source 61a is replaced with a green LED (incoherent light source) and the light beams of the LED light source are incident on the spatial light modulator 30, that is, in the case where the incoherent light beams of the LED light source as the parallel light flux are incident on the spatial light modulator 30 of the projection-type image display device 10 illustrated in FIG. 1 without the scan device 65 or the optical element 50, the speckle contrast becomes 4.0% (Condition 4). Under the condition, luminance unevenness (brightness unevenness) to a degree that it can be perceived through visual observation does not occur.

The results of Conditions 1 and 2 are much better than the result of Condition 3, and the results of Conditions 1 and 2 are better than the measurement result of Condition 4. As described above, the problem of occurrence of speckles is practically an intrinsic problem occurring in the case of using a coherent light source such as a laser source, and thus, the problem needs not be considered in the case of a device using an incoherent light source such as an LED. In addition, in comparison with Condition 4, in Conditions 1 and 2, the optical element 50 which may cause occurrence of speckles is added. In terms of this point, it is considered that it is possible to sufficiently cope with the speckle defect according to Conditions 1 and 2.

In addition, according to the basic embodiment described above, the following advantages can be obtained.

According to the basic embodiment described above, the optical element 50 for allowing the speckles to be inconspicuous may also function as an optical member for shaping and adjusting the beam shape of the coherent light beam irradiated from the irradiation device 60. Therefore, it is possible to miniaturize and simplify the optical system.

In addition, according to the basic embodiment described above, the coherent light beams incident on the respective positions of the hologram recording medium 55 generates the image 5 of the scattering plate 6 at mutually the same position, and the spatial light modulator 30 is disposed to overlap the image 5. Therefore, the light beams diffracted by the hologram recording medium 55 can be used for image formation with high efficiency, so that use efficiency of the light of the light source 61a is excellent.

[Modification of Basic Embodiment]

The basic embodiment described above based on one specific example exemplified in FIGS. 1 to 5 can be modified in various forms. Hereinafter, modified examples will be described with reference to the drawings. In the drawings used for the description hereinafter, the components corresponding to those of the embodiments described above are denoted by the same reference numerals, and the redundant description thereof will not be provided.

(Illumination Device)

According to the embodiment described above, it is possible to effectively allow the speckles to be inconspicuous. The functions and effects are obtained mainly by the illumination device 40. Therefore, the illumination device 40 may be usefully used in various forms.

(Spatial Light Modulator, Projection Optical System, and Screen)

According to the embodiment described above, it is possible to effectively allow the speckles to be inconspicuous. The functions and effects are obtained mainly by the illumination device 40. In addition, although the illumination device 40 is combined with various well-known spatial light modulators, projection optical systems, screens, and the like, it is possible to effectively allow the speckles to be inconspicuous. In terms of this point, the spatial light modulators, the projection optical systems, and the screens are not limited to the exemplified ones, but various well-known members, parts, devices, and the like may be used.

Figure 6:
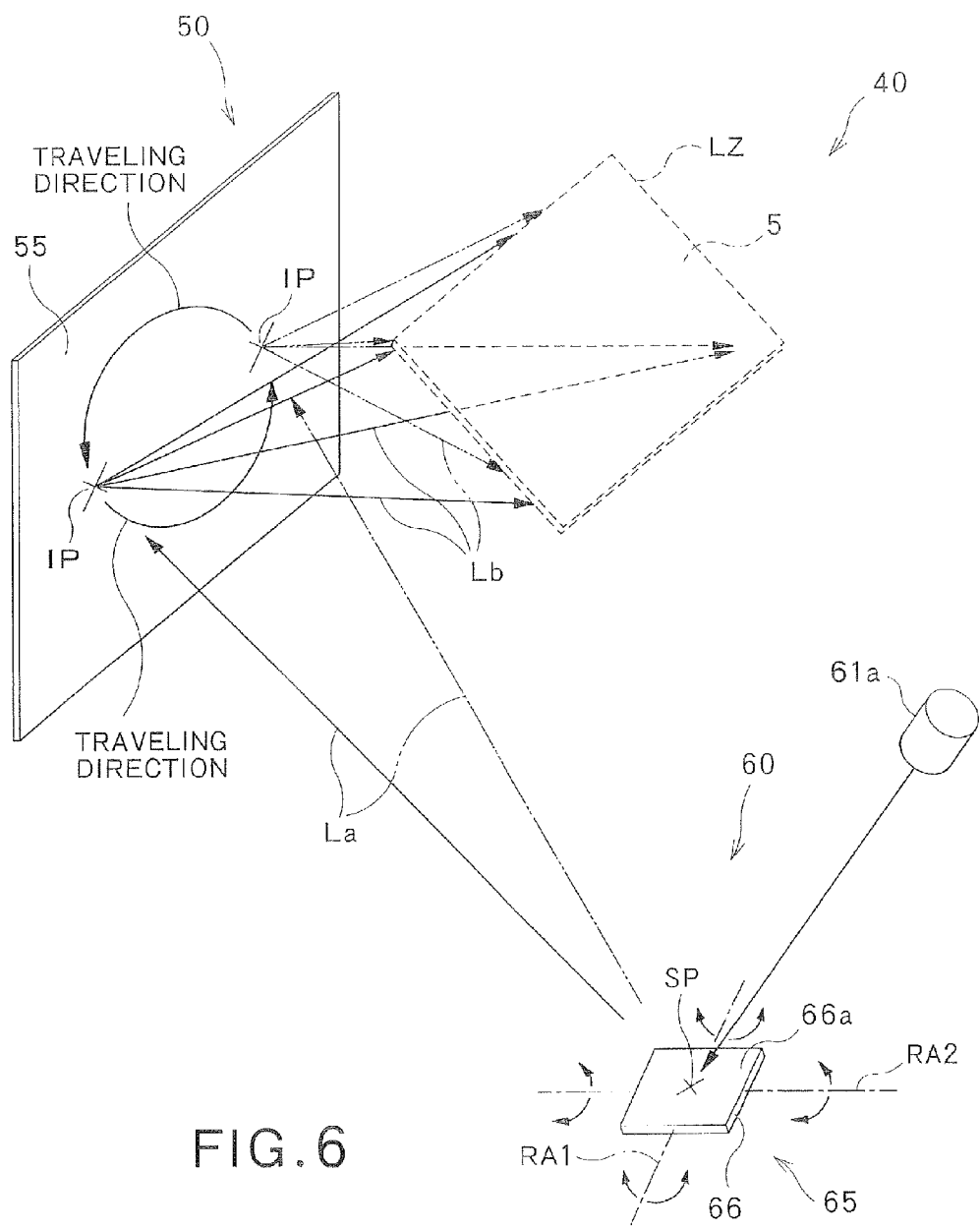
FIG. 6 is a diagram corresponding to FIG. 5 and a perspective diagram illustrating a modified example of an irradiation device and functions thereof.

(Irradiation Device),

In the embodiment described above, the example where the irradiation device 60 is configured to include the laser source 61a and the scan device 65 is illustrated. Although the scan device 65 which is configured with one-axis-rotation type mirror device 66 which changes the traveling directions of the coherent light beams by reflection is exemplified, the scan device 65 is not limited thereto. As illustrated in FIG. 6, the scan device 65 may be configured so that the mirror (reflection surface 66a) of the mirror device 66 can rotate about not only the first rotation axial line RA1 but also the second rotation axial line RA2 intersecting the first rotation axial line RA1. In the example illustrated in FIG. 6, the second rotation axial line RA2 of the mirror 66a is perpendicular to the first rotation axial line RA1 which is extended in parallel to the Y axis of the XY coordinate system defined on the plate plane of the hologram recording medium 55. In addition, since the mirror 66a can rotate about both of the first axial line RA1 and the second axial line RA2, the incidence point IP of the coherent light beam of the irradiation device 60 incident on the optical element 50 can be moved on the plate plane of the hologram recording medium 55 in two-dimensional directions. Therefore, as an example, as illustrated in FIG. 6, the incidence point IP of the coherent light beam incident on the optical element 50 can also be moved along a circumference.

In addition, the scan device 65 may be configured to include two or more mirror devices 66. In this case, although the mirror 66a of the mirror device 66 can rotate about only a single axial line, the incidence point IP of the coherent light beam of the irradiation device 60 incident on the optical element 50 can be moved on the plate plane of the hologram recording medium 55 in two-dimensional directions.

In addition, as a specific example of the mirror device 66a included in the scan device 65, there are a MEMS mirror, a polygon mirror, and the like.

In addition, the scan device 65 may be configured to include a device besides a reflection device (for example, the mirror device 66 described above) which changes the traveling directions of the coherent light beams by reflection. For example, the scan device 65 may include a refraction prism or lens or the like.

Essentially, the scan device 65 is not a necessary component. The light source 61a of the irradiation device 60 may be configured so that the light source can be displaced (moved, oscillated, and rotated) with respect to the optical element 50 and so that the coherent light beams irradiated from the light source 61a are allowed to scan the hologram recording medium 55 according to the displacement of the light source 61a with respect to the optical element.

In addition, although the description hereinbefore is made under the presumption that the light source 61a of the irradiation device 60 oscillates a laser beam which is shaped as a linear light beam, the preset invention is not limited thereto. Particularly, in the embodiment described above, the coherent light beams irradiated on the respective positions of the optical element 50 are shaped by the optical element 50 as a light flux which is incident on the entire area of the illuminated zone LZ. Therefore, although the coherent light beams irradiated from the light source 61a of the irradiation device 60 on the optical element 50 are not accurately shaped, no problem occurs. For this reason, the coherent light beams generated from the light source 61a may be a diverging light beam. In addition, the shape of a cross section of the coherent light beam generated from the light source 61a may be an ellipse or the like instead of a circle. In addition, the transverse mode of the coherent light beam generated from the light source 61a may be a multi-mode.

In addition, in the case where the light source 61a generates the diverging light flux, when the coherent light beams are incident on the hologram recording medium 55 of the optical element 50, each of the light beams is incident on not a spot but a zone having somewhat area. In this case, the light beams which are diffracted by the hologram recording medium 55 to be incident on the respective positions of the illuminated zone LZ are multiplexed in terms of angle. In other words, in each instant, the coherent light beams are incident from the directions of certain angle ranges on the respective positions of the illuminated zone LZ. Due to the multiplexing in terms of angle, it is possible to more effectively allow the speckles to be inconspicuous.

Figure 7:
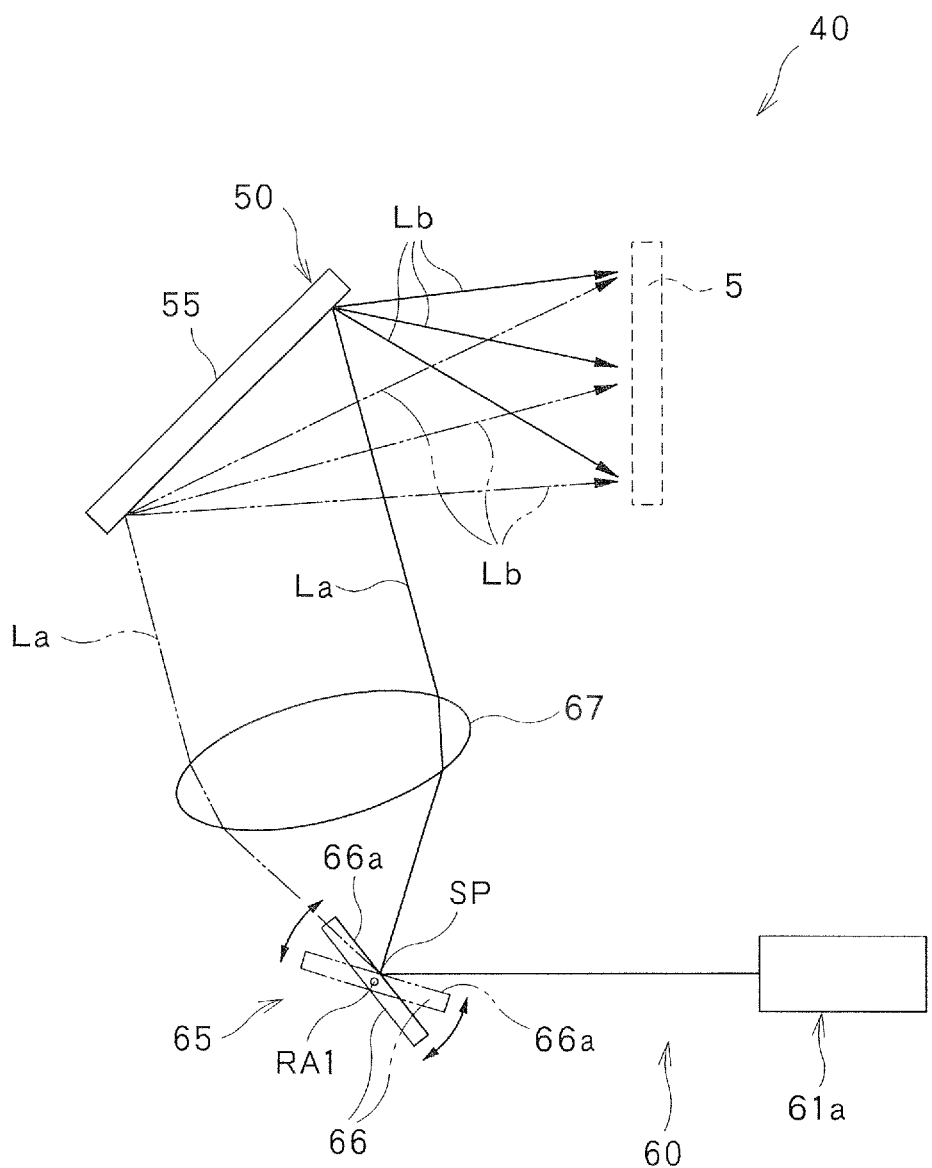
FIG. 7 is a diagram corresponding to FIG. 2 and a perspective diagram illustrating another modified example of an irradiation device and functions thereof.

In addition, in the embodiment described above, although the example where the irradiation device 60 is configured so as to trace the optical path of the one light ray constituting the diverging light flux so that the coherent light beams are allowed to be incident on the optical element 50 is described, the present invention is not limited thereto. For example, in the embodiment described above, the scan device 65 may be configured to further include a collection lens 67 disposed at the downstream side of the mirror device 66 along the optical path of the coherent light beam. In this case, as illustrated in FIG. 7, the light beam of the mirror device 66, which travels along the optical path of the light beam constituting the diverging light flux, is allowed by the collection lens 67 to become the light beam which travels in a certain direction. In other words, the irradiation device 60 is configured so as to trace the optical path of the light beams constituting the parallel light flux, so that the coherent light beams are allowed to be incident on the optical element 50. In this example, in the exposing process during the manufacturing of the hologram recording medium 55, instead of the converging light flux described above, the parallel light flux is used as the reference light beams Lr. The hologram recording medium 55 can be more simply manufactured and replicated.

In the embodiment described above, although the example in which the irradiation device 60 is configured to include only one laser source 61a is described, the present invention is not limited thereto. For example, the irradiation device 60 may be configured to include a plurality of the light sources which oscillate light beams having the same wavelength range. In this case, the illumination device 40 can illuminate the illuminated zone LZ more brightly. In addition, the coherent light beams of other solid-state laser sources mutually have no coherency. Therefore, the multiplexing of the scattering patterns further progresses, so that it is possible to allow the speckles to be more inconspicuous.

In addition, the irradiation device 60 may be configured to include a plurality of light sources which generates coherent light beams having different wavelength ranges. According to the example, a color which is difficult to display by using a single light beam is generated through additive color mixture, so that it is possible to illuminate the illuminated zone LZ with the associated color. In addition, in this case, in the projection device 20 or the projection-type image display device 10, in the case where the spatial light modulator 30 includes, for example, a color filter and the modulation images for the coherent light beams having the respective wavelength ranges can be formed, it is possible to display an image in plural colors. Alternatively, although the spatial light modulator 30 does not include a color filter, in the case where the irradiation device 60 performs irradiation with the coherent light beams having the respective wavelength ranges in a time division manner and the spatial light modulator 30 is operated in a time division manner so that the modulation images corresponding to the irradiated coherent light beams having the wavelength ranges are formed, it is possible to display an image in plural colors. Particularly, in the projection device 20 or the projection-type image display device 10, in the case where irradiation device 60 is configured to include a light source generating a coherent light beam having a wavelength range corresponding to red light, a light source generating a coherent light beam having a wavelength range corresponding to green light, and a light source generating a coherent light beam having a wavelength range corresponding to blue light, it is possible to display an image in full color.

In addition, the hologram recording medium 55 included in the optical element 50 has wavelength selectivity. Therefore, when the irradiation device 60 includes light sources having different wavelength ranges, the hologram recording medium 55 may be configured to include hologram components corresponding to the respective wavelength ranges of the coherent light beams generated from the respective light sources in a laminated state. The hologram components for the coherent light beams having the respective wavelength ranges may be manufactured, for example, by using the coherent light beams having the corresponding wavelength ranges as the exposure light beams (reference light beams Lr and object light beams Lo) in the method described above with reference to FIGS. 3 and 4. In addition, instead of manufacturing the hologram recording medium 55 by laminating the hologram components having the respective wavelength ranges, the hologram photosensitive material 58 are exposed simultaneously to the object light beams Lo and the reference light beams Lr configured with the coherent light beams having the respective wavelength ranges, so that light beams having a plurality of wavelength ranges can be diffracted by the single hologram recording medium 55.

(Optical Element)

In the embodiment described above, although the example where the optical element 50 is configured with a reflection-type volume hologram 55 using a photopolymer is described, the present invention is not limited thereto. As described above, the optical element 50 may be configured to include a plurality of the hologram recording media 55. In addition, the optical element 50 may include a type of a volume hologram where recording is performed by using a photosensitive medium including a silver halide material. In addition, the optical element 50 may include a transmission-type volume hologram recording medium, and the optical element 50 may include a relief-type (emboss-type) hologram recording medium.

With respect to the relief-type (emboss-type) hologram, hologram interference fringe is recorded by a convex-concave structure of a surface thereof. However, in the case of the relief type hologram, since scattering due to the convex-concave structure of the surface may also cause occurrence of speckles, the volume hologram is preferred in terms of this point. In the case of the volume hologram, since hologram interference fringe is recorded by using a refractive index modulation pattern (refractive index distribution) of an inner portion of the medium, there is no influence of the scattering due to the convex-concave structure of the surface.

However, even in the case of the volume hologram, if recording is performed by using a photosensitive medium including a silver halide material, scattering due to silver halide particles may also cause occurrence of speckles. Therefore, as the hologram recording medium 55, the volume hologram using a photopolymer is preferred in terms of this point.

In addition, in the exposing process illustrated in FIG. 3, although a so-called Fresnel type hologram recording medium is manufactured, a Fourier transform type hologram recording medium which can be obtained through recording using lenses may be manufactured. However, in the case of using the Fourier transform type hologram recording medium, the lenses can be used even during the image reproduction.

In addition, a striped pattern (refractive index modulation pattern or convex-concave pattern) which is to be formed on the hologram recording medium 55 may be designed by using a computer based on wavelengths or incident directions of predetermined reproduction illumination light beams La, shapes or positions of to-be-reproduced image, and the like without use of the actual object light beams Lo and the reference light beams Lr. The hologram recording medium 55 obtained in this manner is also called a computer generated hologram. In addition, similarly to the modified example described above, in the case where a plurality of the coherent light beams having mutually different wavelength ranges are irradiated from the irradiation device 60, the hologram recording medium 55 as the computer generated hologram recording medium may be configured so as to be partitioned planarly into a plurality of zones disposed corresponding to the coherent light beams having the respective wavelength ranges, and the coherent light beams having the wavelength ranges are diffracted by the corresponding zones to reproduce the image.

In addition, in the embodiment described above, although the example where the optical element 50 is configured to include the hologram recording medium 55 as a light diffusion element or a light diffusion component which spreads the coherent light beams irradiated on the respective positions thereof and illuminates the entire area of the illuminated zone LZ by using the spread coherent light beams is described, the present invention is not limited thereto. Instead of the hologram recording medium 55 or in addition to the hologram recording medium 55, the optical element 50 may be configured to include a lens array as a light diffusion element which changes the traveling directions of the coherent light beams irradiated on the respective positions and diffuses the coherent light beams to illuminate the entire area of the illuminated zone LZ with the coherent light beams. As a specific example of the lens array functioning as a light diffusion element, a total-reflection-type or refraction-type Fresnel lens added with a diffusion function, a fly-eye lens, or the like may be exemplified. In the illumination device 40, the irradiation device 60 and the optical element 50 may also be configured so that the irradiation device 60 allows the coherent light beams to scan the light diffusion element including the lens array to irradiate the optical element 50 with the coherent light beams and so that the traveling directions of the coherent light beams incident from the irradiation device 60 on the respective positions of the optical element 50 are changed by the lens array as a light diffusion element to illuminate the illuminated zone LZ with the coherent light beams. Therefore, it is possible to effectively allow the speckles to be inconspicuous.

(Illuminating Method)

In the embodiment described above, as an example, the irradiation device 60 is configured so as to allow the coherent light beams to scan the optical element 50 in one-dimensional direction, and the light diffusion element 55 which is configured with the hologram recording medium, the lens array, or the like of the optical element 50 is configured so as to diffuse (spread, diverge) the coherent light beams irradiated on the respective positions in two-dimensional directions, so that the illumination device 40 may illuminate the two-dimensional illuminated zone LZ. However, as described above, the present invention is not limited to. For example, the irradiation device 60 may be configured so as to scan the optical element 50 with the coherent light beams in two-dimensional directions and the light diffusion element 55 which is configured with the hologram recording medium, the lens array, or the like of the optical element 50 may be configured so as to diffuse (spread, diverge) the coherent light beams irradiated on the respective positions in two-dimensional directions, so that the illumination device 40 may illuminate the two-dimensional illuminated zone LZ (described above with reference to FIG. 6)

In addition, the irradiation device 60 may be configured so as to scan the optical element 50 with the coherent light beams in one-dimensional direction, and the light diffusion element 55 which is configured with the hologram recording medium, the lens array, or the like of the optical element 50 may be configured so as to diffuse (spread, diverge) the coherent light beams irradiated on the respective positions mainly in the one-dimensional direction, so that the illumination device 40 may illuminate the one-dimensional illuminated zone LZ. In the embodiment, the scan direction of the coherent light beams by the irradiation device 60 and the diffusion direction (spread direction) of the light diffusion element 55 which is configured with the hologram recording medium, the lens array, or the like of the optical element may be set to be parallel to each other.

In addition, the irradiation device 60 may be configured so as to scan the optical element 50 with the coherent light beams in one-dimensional direction or in two-dimensional directions, and the light diffusion element 55 which is configured with the hologram recording medium, the lens array, or the like of the optical element 50 may be configured so as to diffuse (spread, diverge) the coherent light beams irradiated on the respective positions mainly in one-dimensional direction. In the embodiment, the optical element 50 may be configured to include a plurality of light diffusion elements 55 to sequentially illuminate the illuminated zones LZ corresponding to the light diffusion elements 55, so that the illumination device 40 may illuminate the two-dimensional zone. In this case, the illuminated zones LZ may be sequentially illuminated at such a speed that it is recognized by human eyes that the illuminated zones LZ are simultaneously illuminated, or the illuminated zones LZ may be sequentially illuminated at such a low speed that it is recognized by human eyes that the illuminated zones LZ are sequentially illuminated.

(Combination of Modified Examples)

In addition, although several modified examples of the basic embodiments are described hereinbefore, it is obvious that a combination of a plurality of the modified examples is available.

<Applied Form>
[Configuration and Functions of Applied Form]

Next, an applied form where the basic embodiment described above is applied to a device capable of displaying a 3D image will be described with reference to the illumination device 40, the projection device 20, and the projection-type image display device 10 illustrated in FIGS. 8 to 11. In the description hereinafter, only the components added to the basic embodiment described above will be described. The other components having the same configurations as those of the basic embodiment described above will be denoted by the same reference numerals in FIGS. 8 to 11, and the redundant description thereof will not be provided.

In the applied form, the hologram recording medium 55 of the optical element 50 includes a first zone Z1 and a second zone Z2. Particularly, in the example illustrated, the hologram recording medium 55 is configured with only two zones of the first zone Z1 and the second zone Z2. In other words, in the example illustrated, the hologram recording medium 55 is partitioned into only two zones of the first zone Z1 and the second zone Z2. In addition, as well illustrated in FIG. 10, the hologram recording medium 55 is divided in half in the Y axis direction (divided in half into upper and lower portions) so that the area of the first zone Z1 becomes equal to the area of the second zone Z2.

On the other hand, as described above in the basic embodiment, the irradiation device 60 of the illumination device 40 irradiates the optical element 50 with the coherent light beams so as to allow the coherent light beams to scan the hologram recording medium 55 of the optical element 50. Particularly, in the embodiment described herein, as illustrated in FIG. 10, the irradiation device 60 irradiates the optical element 50 with the coherent light beams so as to allow the coherent light beams to scan the two zones of the first zone Z1 and the second zone Z2 of the hologram recording medium 55.

In addition, the hologram recording medium 55 itself, in the respective zones of first zone Z1 and the second zone Z2, does not influence different optical functions to the coherent light beams irradiated from the irradiation device 60, but the hologram recording medium 55 is partitioned into the first zone Z1 and the second zone Z2 simply for the convenience. Therefore, one hologram recording medium 55 is manufactured by using the method described above in the basic embodiment with reference to FIGS. 3 and 4, and the one portion of the manufactured hologram recording medium 55 may constitute the first zone Z1, and the other portion of the hologram recording medium 55 may constitute the second zone Z2.

Figure 8:
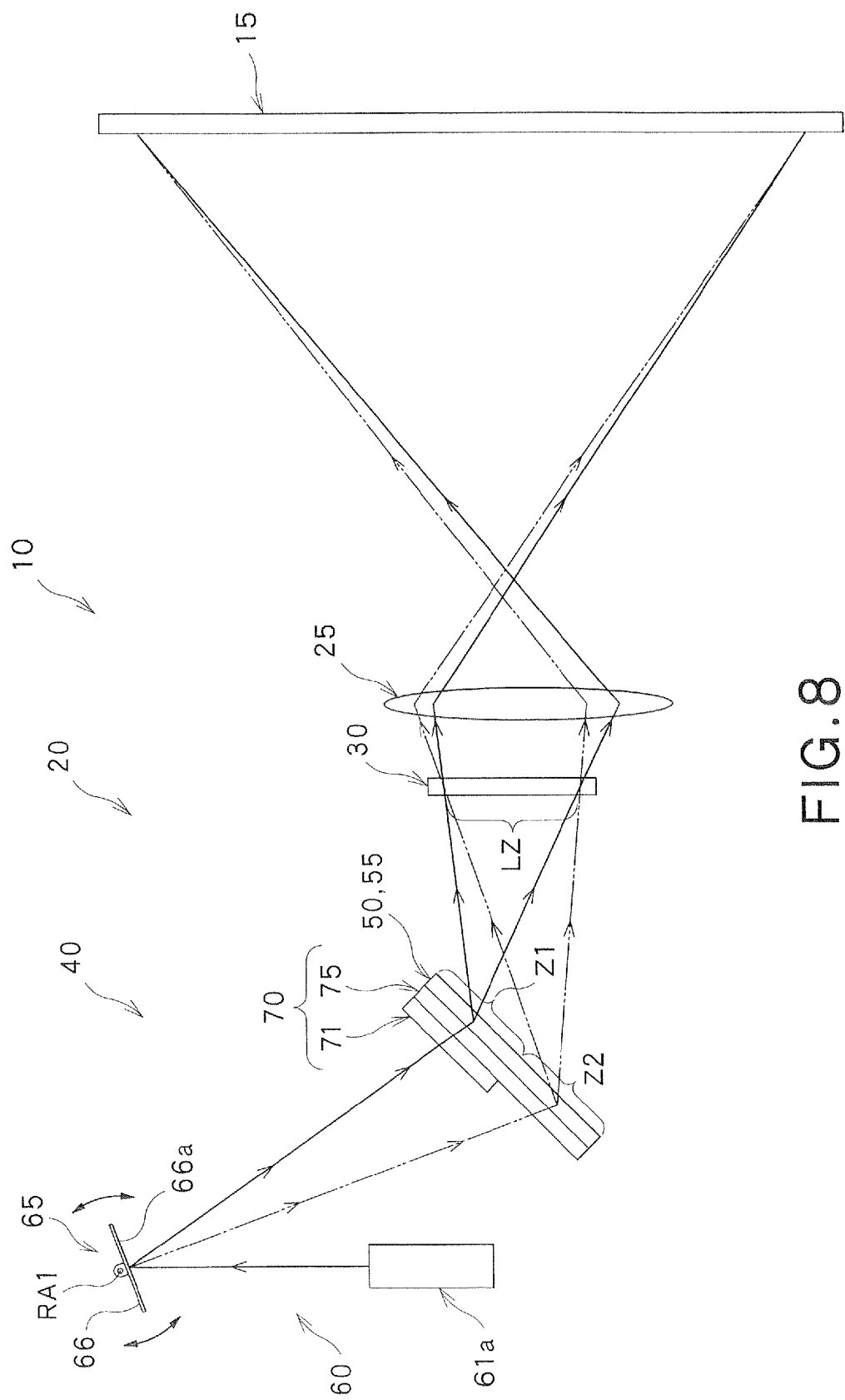
FIG. 8 is a diagram illustrating an applied form as an application of a basic form according to an embodiment of the present invention and illustrating schematic configurations of an illumination device, a projection device, and a projection-type image display device as a specific example of the applied form.
Figure 9:
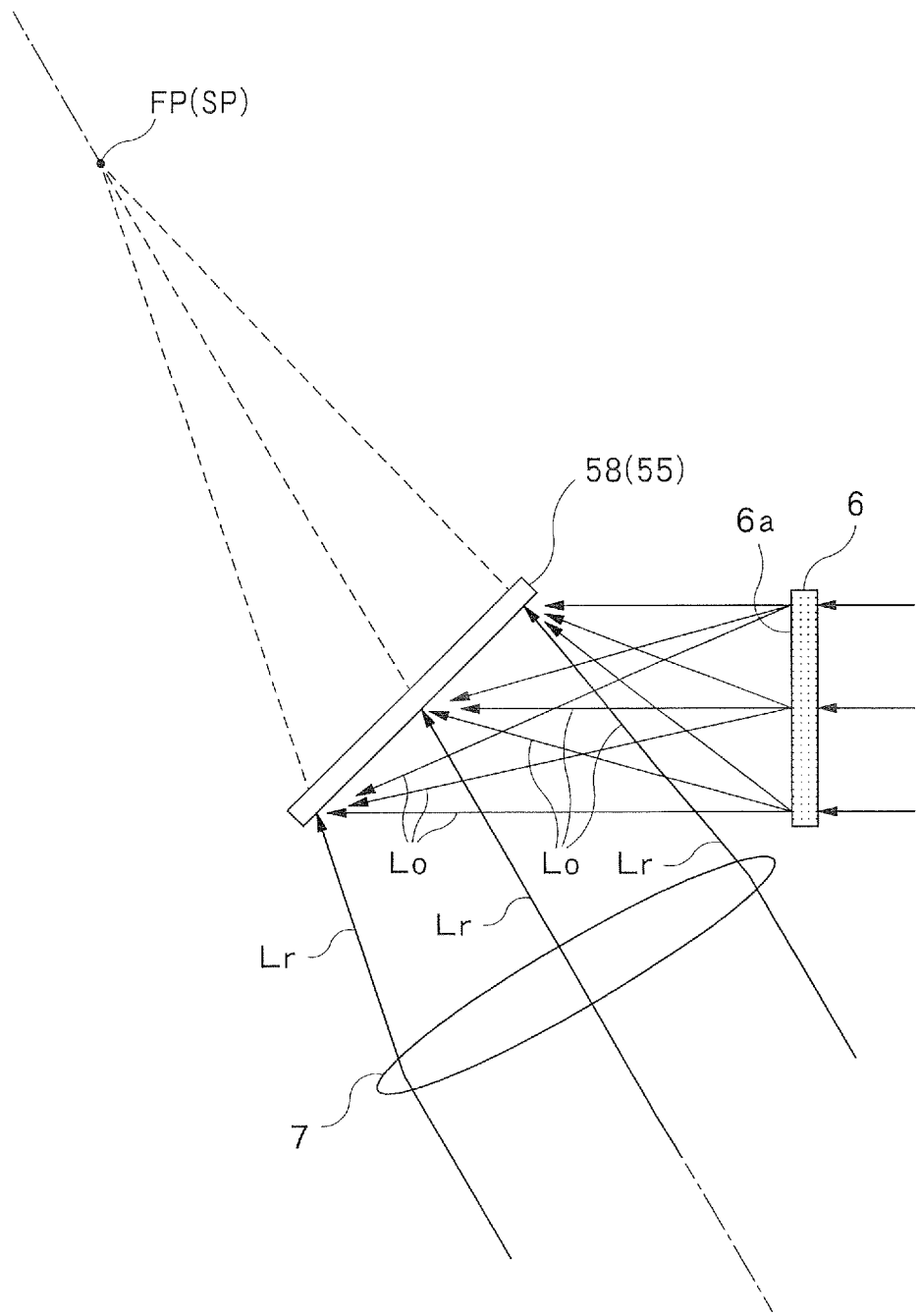
FIG. 9 is a diagram corresponding to FIG. 3 and a diagram illustrating an exposure method for manufacturing a hologram recording medium constituting an optical element of the illumination device of FIG. 8.
Figure 10:
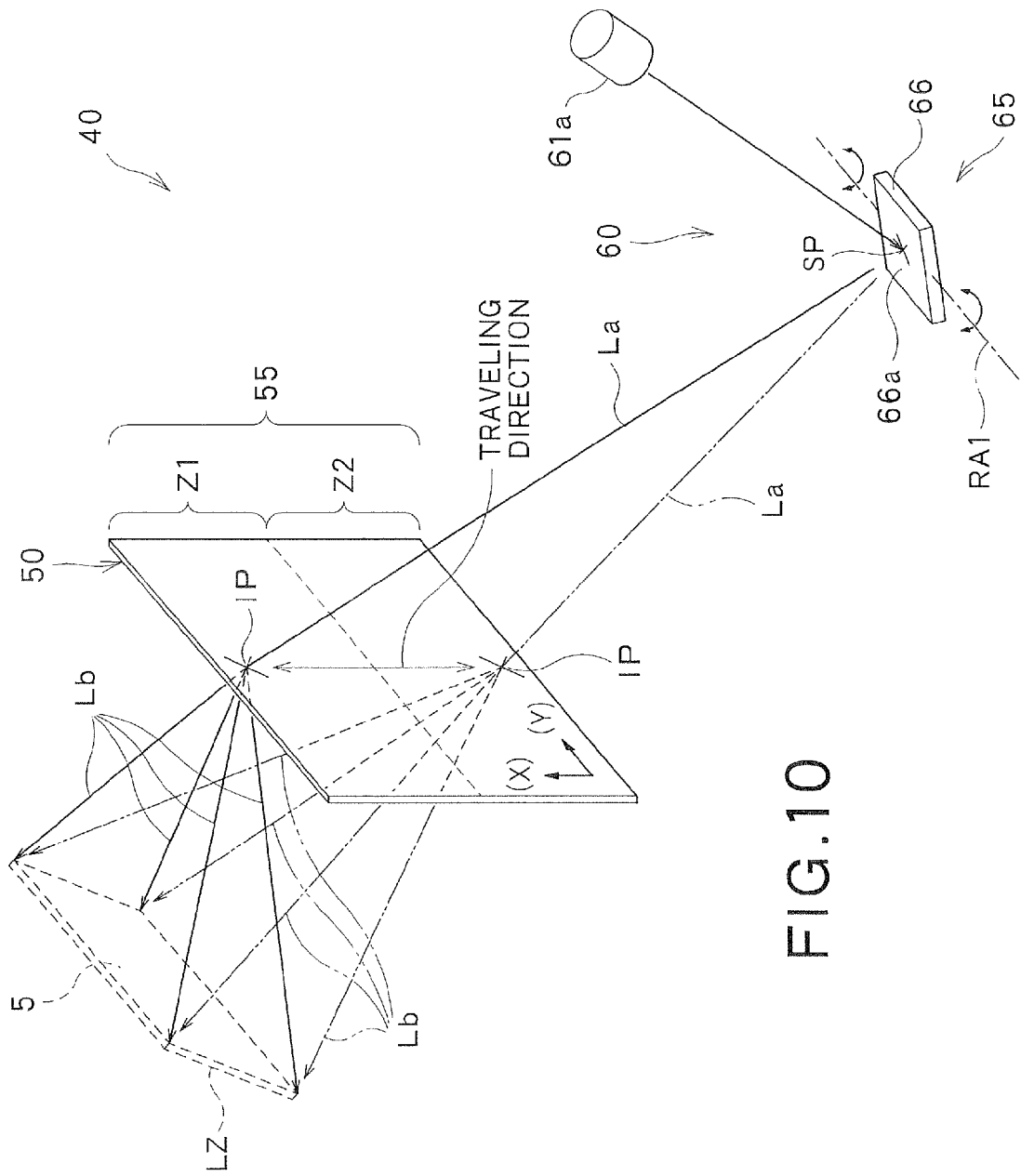
FIG. 10 is a diagram corresponding to FIG. 5 and a perspective diagram illustrating the illumination device of FIG. 8. In addition, in FIG. 10, a polarization control unit of the illumination device is not provided.
Figure 11:
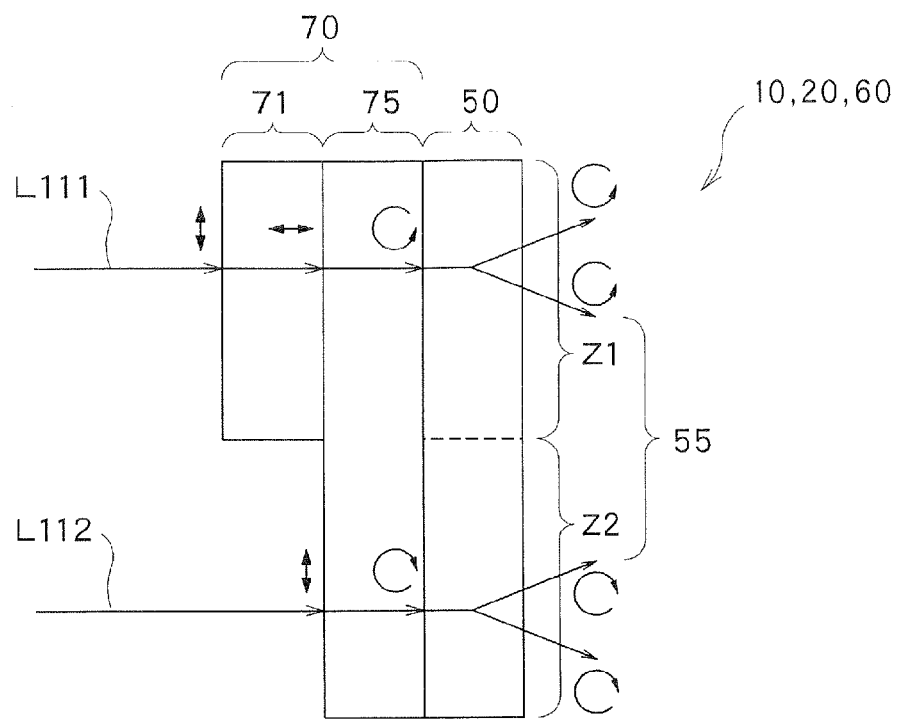
FIG. 11 is a diagram illustrating functions of the polarization control unit of the illumination device of FIG. 8.

In FIGS. 8, 10, and 11, the hologram recording medium 55 is configured as a transmission-type volume hologram. In addition, FIG. 9 illustrates an exposure method for the hologram recording medium 55 as the transmission-type volume hologram. As illustrated in FIG. 9, in the manufacturing of the transmission-type volume hologram, the side of the one plane of a hologram photosensitive material 58 which constitutes the hologram recording medium 55 is irradiated with the reference light beams Lr and the object light beams Lo. Similarly to the exposure method described above with reference to FIG. 3, the hologram photosensitive material 58 is irradiated with the object light beams Lo as scattered light beams passing through the scattering plate 6. The hologram photosensitive material 58 is also irradiated with the reference light beams Lr as converging light beams which converge to the focal point FP located beyond the hologram photosensitive material 58.

With respect to the hologram recording medium 55 manufactured through the exposing process illustrated in FIG. 9, the light beams having the same wavelength range as that of the laser beam used for the exposing process, which travel in the reverse direction along the optical path of the reference light beams Lr in the exposing process, satisfy the Bragg condition. Therefore, as illustrated in FIG. 8, if the coherent light beams are irradiated from the irradiation device 60 on the hologram recording medium 55 along the optical path of the light beams constituting a diverging light flux which diverge from a standard point SP located with respect to the hologram recording medium 55 so as to have the same positional relation as the relative position (refer to FIG. 9) of the focal point FP with respect to the hologram photosensitive material 58 during the exposing process and have the same wavelength as that of the reference light beams Lr during the exposing process, the coherent light beams are diffracted as the reproduction illumination light beams La by the hologram recording medium 55, so that the reproduced image 5 of the scattering plate 6 is generated at a specific position with respect to the hologram recording medium 55 which has the same positional relation as the relative position (refer to FIG. 9) of the scattering plate 6 with respect to the hologram photosensitive material 58 during the exposing process.

In the example illustrated in FIG. 8, the irradiation device 60 and the optical element 50 are positioned so that the coherent light beams which are incident from the irradiation device 60 on the respective positions of the hologram recording medium 55 are allowed to reproduce the image 5 of the scattering plate 6 superimposed on the illuminated zone LZ. In addition, as described above, the hologram recording medium 55 is partitioned into the first zone Z1 and the second zone Z2. Therefore, the coherent light beams incident from the irradiation device 60 on the respective positions in the first zone Z1 of the hologram recording medium 55 are allowed to reproduce the images 5 of the scattering plate 6 superimposed on the illuminated zone LZ. In addition, the coherent light beams incident from the irradiation device 60 on the respective positions in the second zone Z2 of the hologram recording medium 55 are allowed to reproduce the same images 5 of the scattering plate 6 as those of the case where the coherent light beams are incident on the first zone Z1 superimposed on the same illuminated zone LZ as that of the case where the coherent light beams are incident on the first zone Z1.

On the other hand, in the applied form, the spatial light modulator 30 forms two modulation images of a first modulation image corresponding to the coherent light beam incident through the first zone Z1 on the spatial light modulator 30 and a second modulation image corresponding to the coherent light beam incident through the second zone Z2 on the spatial light modulator 30 in a time division manner, that is, sequentially in a very-small time unit. Herein, the first modulation image is defined as an image for observation of the one eye, and the second modulation image is defined as an image for the other eye, so that a 3D image is enabled to be displayed. In other words, a 3D image is enabled to be displayed as an "active shutter glasses type" where the right-eye image and the left-eye image are displayed in a time division manner.

More specifically, by using dedicated glasses for the "active shutter glasses type" where image observation by the observer's right eye and image observation by the observer's left eye are alternatively enabled in a time division manner, the observer can observe a first image projected on the screen 15 as a first modulation image by the one eye (for example, the right eye) and can observe a second image projected on the screen 15 as a second modulation image by the one eye (for example, the left eye). At this time, if the time division operation of the spatial light modulator 30 corresponding to the scan operation by the irradiation device 60 is performed at such a high speed that the operation cannot be detected by human eyes, the observer observe that image so that the first image for the one eye seems to be continuously displayed and the second image for the other eye also seems to be continuously displayed, and thus, the observation of the first image by the one eye and the observation of the second image by the other eye are simultaneously performed, so that the observer can stereoscopically observe the image.

In addition, the irradiation device 60 irradiates the optical element 50 with the coherent light beams so as to allow the coherent light beams to scan the first zone Z1 and the second zone Z2 of the hologram recording medium 55. Therefore, the first image is configured with the coherent light beams which are incident on the respective positions in the first zone Z1 of the hologram recording medium 55 to illuminate the spatial light modulator 30. At this time, similarly to the embodiment described above, due to the scanning of the coherent light beam on the first zone Z1 of the hologram recording medium 55, the incident direction of the coherent light beam diffracted by the first zone Z1 of the hologram recording medium 55 at each position of the illuminated zone LZ (spatial light modulator 30) is continuously changed as time elapses. Accordingly, the incident direction of the first image light beam configured with the coherent light beams projected from the projection device 20 at each position of the screen 15 is also continuously changed as time elapses. Therefore, as described above in the basic embodiment, speckle patterns having no correlation are superimposed each other to be averaged, so that the speckles observed by the observer's eye which is to observe the first image are allowed to be inconspicuous.

Similarly, due to the scanning of the coherent light beam on the second zone Z2 of the hologram recording medium 55, the incident direction of the coherent light beam diffracted by the second zone Z2 of the hologram recording medium 55 at each position of the illuminated zone LZ (spatial light modulator 30) is continuously changed as time elapses. Accordingly, the incident direction of the second image light beam configured with the coherent light beams projected from the projection device 20 at each position of the screen 15 is also continuously changed as time elapses. Therefore, as described above in the basic embodiment, speckle patterns having no correlation are superimposed each other to be averaged, so that the speckles observed by the observer's eye which is to observe the second image are allowed to be inconspicuous. As a result, the observer can stereoscopically observe the image projected on the screen 15 without minding the speckles.

In the applied form, the illumination device 40 is configured to further include a polarization control unit 70 which is provided on the optical path of the coherent light beams to the illuminated zone LZ. The polarization control unit 70 controls polarization of the coherent light beams traveling toward the illuminated zone LZ (spatial light modulator 30) so that the coherent light beam incident on the first zone Z1 of the hologram recording medium 55 to travel toward the illuminated zone LZ (spatial light modulator 30) is configured with the light beam having the first polarization component and so that the coherent light beam incident on the second zone Z2 of the hologram recording medium 55 to travel toward the illuminated zone LZ (spatial light modulator 30) is configured with the light beam having the second polarization component different from the first polarization component. In other words, in the applied form, the illumination device 40 is configured so as to illuminate the illuminated zone LZ in a time division manner with the coherent light beams configured with the first polarization component and the coherent light beams configured with the second polarization component different from the first polarization component. As a specific example of the configuration, the illumination device 40 illustrated in FIGS. 8 and 10 are configured as follows.

Similarly to the basic embodiment, the irradiation device 60 is configured to include a light source 61a which generates a coherent light beam and a scan device 65 which changes a traveling direction of the coherent light beam from the light source 61a so that the coherent light beam is allowed to scan the optical element 50. As an example, the light source 61a is configured to oscillate a coherent light beam as a linearly-polarized light beam having a vibration direction, that is, a linearly-polarized light beam which vibrates in a certain vibration direction. In the combination to the light source 61a, the polarization control unit 70 is configured to include a ½ wave plate (½λ plate) 71 as a first polarization control element. As illustrated in FIGS. 8 and 11, the ½ wave plate 71 is laminated on the optical element 50 so as to overlap the first zone Z1 of the hologram recording medium 55, that is, so as to cover the first zone Z1. Therefore, the coherent light beam L111 incident from the laser source 61a on the first zone Z1 of the hologram recording medium 55 to travel toward the illuminated zone LZ passes through the ½ wave plate 71 constituting the polarization control unit 70.

The ½ wave plate 71 (first polarization control element) can shift the vibration direction of the linearly-polarized light beam from the laser source 61a, which vibrates in a certain direction, by 90°. In other words, the coherent light beam L111 traveling from the laser source 61a toward the first zone Z1 of the hologram recording medium 55 passes through the ½ wave plate 71 constituting the polarization control unit 70, so that the vibration direction is shifted by 90°. On the other hand, the second zone Z2 of the hologram recording medium 55 is not covered by the ½ wave plate 71. Therefore, the vibration direction of the coherent light beam L112 incident from the laser source 61a on the second zone Z2 of the hologram recording medium 55 to travel toward the illuminated zone LZ is not disturbed but maintained by the ½ wave plate 71 as a first polarization control element. In this manner, in the example illustrated, the ½ wave plate 71 of the polarization control unit 70 allows the polarization state of the coherent light beam L111 which is incident on the first zone Z1 of the hologram recording medium 55 to travel toward the illuminated zone LZ and the polarization state of the coherent light beam L112 which is incident on the second zone Z2 of the hologram recording medium 55 to travel toward the illuminated zone LZ to be different from each other.

In addition, in the examples illustrated in FIGS. 8 and 11, the polarization control unit 70 of the illumination device 40 is configured to further include a ¼ wave plate (¼λ plate) 75 as a second polarization control element. The ¼ wave plate 75 generally converts a linearly-polarized light beam to a circularly-polarized light beam and reversely converts a circularly-polarized light beam to a linearly-polarized light beam. In the illumination device 40 illustrated in FIGS. 8 and 11, the ¼ wave plate 75 is laminated on the optical element 50 so as to overlap both of the first zone Z1 and the second zone Z2 of the hologram recording medium 55, that is, so as to cover both of the first zone Z1 and the second zone Z2. Therefore, the ¼ wave plate 75 changes the polarization states of the coherent light beams traveling toward both of the first zone Z1 and the second zone Z2 of the hologram recording medium 55 from the linearly-polarized light beam to the circularly-polarized light beam.

However, as described above, due to the polarization control unit 70, the vibration direction of the linearly-polarized light beam constituting the coherent light beam 111 traveling toward the first zone Z1 of the hologram recording medium 55 is perpendicular to the vibration direction of the linearly-polarized light beam constituting the coherent light beam L112 traveling toward the second zone Z2 of the hologram recording medium 55. Therefore, after the linearly-polarized light beam is converted to the circularly-polarized light beam by the ¼ wave plate 75, the circulation direction of the circularly-polarized light beam constituting the coherent light beam L111 traveling toward the first zone Z1 and the circulation direction of the circularly-polarized light beam constituting the coherent light beam L112 traveling toward the second zone Z2 are reverse to each other. As an example, in the example illustrated in FIG. 11, the coherent light beam incident on the first zone Z1 of the hologram recording medium 55 to travel toward the illuminated zone LZ (spatial light modulator 30) becomes a left circularly-polarized light beam (circularly-polarized light beam of which circulation direction is the left direction) as a first polarization component; and the coherent light beam incident on the second zone Z2 of the hologram recording medium 55 to travel toward the illuminated zone LZ (spatial light modulator 30) becomes a right-circularly-polarized light beam (circularly-polarized light beam of which circulation direction is the right direction) as a second polarization component different from the first polarization component.

In addition, as described above, the spatial light modulator 30 forms the two modulation images of the first modulation image corresponding to the coherent light beam incident through the first zone Z1 on the spatial light modulator 30 and the second modulation image corresponding to the coherent light beam incident through the second zone Z2 on the spatial light modulator 30 in a time division manner. Therefore, in other words, in the applied form, the spatial light modulator 30 forms the first modulation image corresponding to the coherent light beam configured with the first polarization component and the second modulation image corresponding to the coherent light beam configured with the second polarization component in a time division manner. Accordingly, the first image projected on the screen 15 as the first modulation image is formed by the light beams having the first polarization component, and the second image projected on the screen 15 as the second modulation image is formed by the light beams having the second polarization component.

Therefore, by using dedicated glasses for the "passive polarized glasses type" where observation of the image configured with the first polarization components by the observer's one-side eye (for example, right eye) and observation of the image configured with the second polarization components by the observer's the-other-side eye (for example, left eye) are enabled, the observer can observe the first image projected on the screen 15 as the first modulation image by the one eye and can observe the second image projected on the screen 15 as the second modulation image by the other eye. In other words, in the applied form, in the case of using the dedicated glasses for the "passive polarized glasses type" as well as in the case of using the dedicated glasses for the "active shutter glasses type", it is possible to stereoscopically observe the image.

According to the applied form described hereinbefore, the hologram recording medium 55 of the optical element 50 diffracts the coherent light beams incident on the respective positions of the hologram recording medium 55 so as to allow the coherent light beams to scan the hologram recording medium 55, so that the spatial light modulator 30 arranged to be superimposed on the illuminated zone LZ is illuminated. At the time, the respective positions of the spatial light modulator 30 are irradiated with the coherent light beams continuously in the different directions according to the scanning of the coherent light beams on the hologram recording medium 55, so that the incident angle of the image light beam at each position of the screen 15 is also continuously changed. Therefore, it is possible to allow the speckles to be inconspicuous while displaying the image with the coherent light beams.

In addition, by the very simple, easy configuration where the coherent light beams are allowed to scan the hologram recording medium 55 and the polarization of the coherent light beams from the light source 61a can be easily controlled, the spatial light modulators 30 arranged to be superimposed on the illuminated zone LZ can be illuminated in a time division manner with the coherent light beams having the first polarization component and the coherent light beams having the second polarization component different from the first polarization component. Therefore, the spatial light modulator 30 performs the time division operation so as to form the first modulation image at the timing of the irradiation of the coherent light beams having the first polarization component and so as to form the second modulation image at the timing of the irradiation of the coherent light beams having the second polarization component, so that, in the case of using any one of the dedicated glasses for the "active shutter glasses type" and the dedicated glasses for the "passive polarized glasses type", it is possible to stereoscopically observe the image. Accordingly, by taking into consideration the properties of the screen 15 on which the image is to be displayed, the number of observers, power consumption of the dedicated glasses for the "active shutter glasses type", and the like, 3D image can be observed in the appropriate method.

[Modifications of Applied Form]

Various modifications of the applied form described above with reference to the specific example illustrated in FIGS. 8 to 11 can be made. Hereinafter, an example of the changes (modifications) will be described with reference to FIGS. 12 to 14. In addition, in the example illustrated in FIGS. 12 to 14, the components having the same configurations as those described above are denoted by the same reference numerals, and the description thereof will not be repeated.

Figure 12:
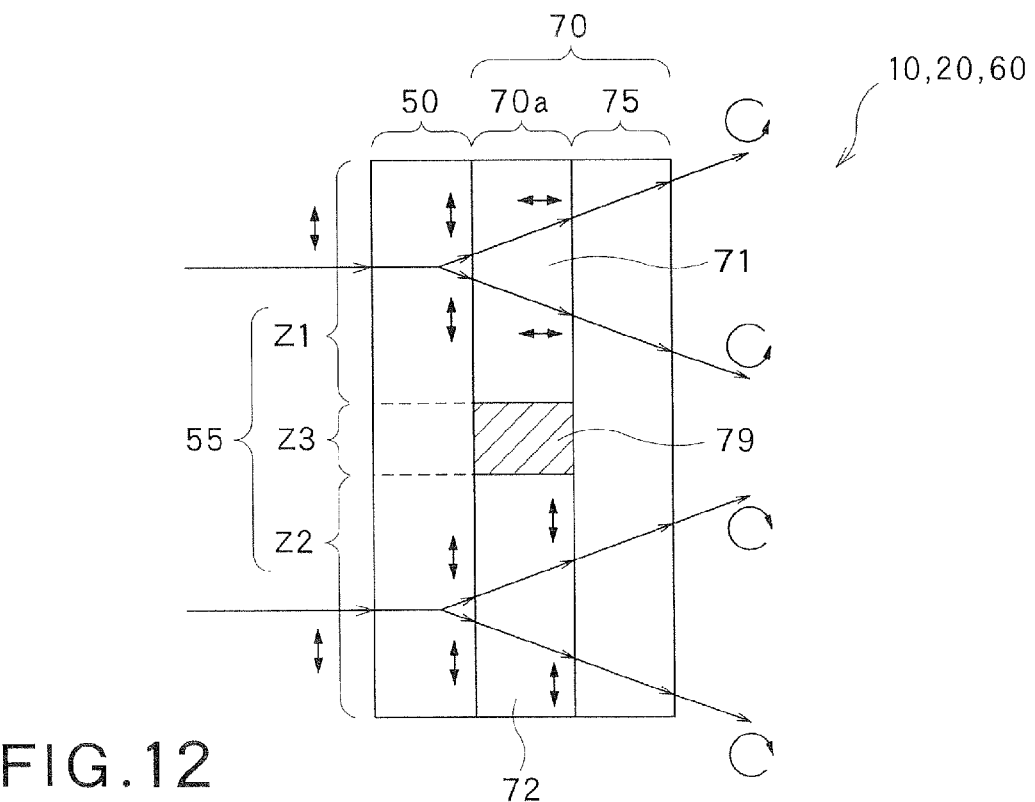
FIG. 12 is a diagram corresponding to FIG. 11 and a diagram illustrating a modified example of the illumination device.

In the example illustrated in FIGS. 8 to 11, the polarization control unit 70 which controls the polarization of the light beam incident on the optical element 50 to travel toward the illuminated zone LZ is configured to include the first polarization control element which controls the polarization so that the polarization state of the light beam incident on the first zone Z1 of the hologram recording medium 55 to travel toward the illuminated zone LZ is different from the polarization state of the light beam incident on the first zone Z1 of the hologram recording medium 55 to travel toward the illuminated zone LZ. In addition, the first polarization control element is configured with only the ½ wave plate (½λ) 71 which is arranged to overlap the first zone Z1 of the hologram recording medium 55. However, as illustrated in FIG. 12, the first polarization control element 70a may be configured to include the transparent layer 72 which is arranged to overlap the second zone Z2 of the hologram recording medium 55 as well as the ½ wave plate 71 which is arranged to overlap the first zone Z1 of the hologram recording medium 55. A low retardation layer, for example, a layer configured with triacetylcellulose (TAC), which does not actively disturb the polarization of the light beam passing through the transparent layer 72 is very appropriately used as the transparent layer 72.

In addition, as illustrated in FIG. 12, the hologram recording medium 55 may further include an intermediate zone Z3 adjacent to the first zone Z1 and the second zone Z2 and located between the first zone Z1 and the second zone Z2. In addition, as illustrated in FIG. 12, a light absorption body (light absorption member, light absorber) 79 may be provided to absorb the coherent light beam on an optical path of the coherent light beam traveling toward the intermediate zone Z3 or an optical path of the coherent light beam traveling toward the illuminated zone LZ (spatial light modulator 30) after incidence on the intermediate zone Z3. As an example of the light absorption body 79, a black matrix formed with a resin configured to include black pigment may be exemplified. According to the example, it is possible to more securely configure the coherent light beams constituting the first modulation image with the first polarization component and to more securely configure the coherent light beams constituting the second modulation image component with the second polarization component. As a result, the display image can be stereoscopically observed in a more stabilized state. In addition, in the example illustrated in FIG. 12, a first polarization control element 70a which controls polarization so that the polarization state of the light beam incident on the first zone Z1 of the hologram recording medium 55 to travel toward the illuminated zone LZ is different from the polarization state of the light beam incident on the second zone Z2 of the hologram recording medium 55 to travel toward the illuminated zone LZ is configured so as to include the light absorption body 79 between the ½ wave plate 71 and the transparent layer 72.

In addition, instead of providing the light absorption body 79 or in addition to providing the light absorption body 79, the irradiation device 60 may perform irradiation intermittently with the coherent light beam so that the coherent light beams are incident on the first zone Z1 and the second zone Z2 but not incident on the intermediate zone Z3. In other words, for example, if the coherent light beam is irradiated from the irradiation device 60, the scan device 65 may be configured so that the coherent light beam is not irradiated from the irradiation device 60 at the timing when the associated coherent light beam is incident on the intermediate zone Z3. According to this example, it is also possible to more securely configure the coherent light beams constituting the first modulation image with the first polarization component and to more securely configure the coherent light beams constituting the second modulation image with the second polarization component.

In addition, in the examples illustrated in FIGS. 8 and 11, although the polarization control unit 70 is laminated at the light incidence side of the optical element 50, the present invention is not limited thereto. For example, as illustrated in FIG. 12, the polarization control unit 70 may be laminated at the light emission side of the optical element 50.

In addition, in the examples illustrated in FIGS. 8 and 11, although the ½ wave plate 71 as a first polarization control element is disposed at the light incidence side of the ¼ wave plate 75 as a second polarization control element, the present invention is not limited thereto. The ¼ wave plate 75 may be disposed at the light incidence side of the ½ wave plate 71. In this example, in the case where the light source 61a emits the linearly-polarized light beam of which vibration direction is aligned as the coherent light beams, first, the ¼ wave plate 75 converts the polarization state of the coherent light beam from the linearly-polarized light beam to the circularly-polarized light beam of which circulation direction is aligned. Next, the ½ wave plate 71 converts the circulation direction of the circularly-polarized light beam constituting the light beam, which is incident on any one of the first zone Z1 and the second zone Z2 of the hologram recording medium 55 to travel toward the illuminated zone LZ (spatial light modulator 30), to the reverse direction.

In addition, in the example illustrated in FIGS. 8 and 11, although the polarization control unit 70 is laminated on the optical element 50, the present invention is not limited thereto. The first polarization control element, which controls the polarization so that the polarization state of the light beam incident on the first zone Z1 of the hologram recording medium 55 to travel toward the illuminated zone LZ is different from the polarization state of the light beam incident on the second zone Z2 of the hologram recording medium 55 to travel toward the illuminated zone LZ, may be arranged at the position where the optical path of the light beam incident on the first zone Z1 to travel toward the illuminated zone LZ and the optical path of the light beam incident on the second zone Z2 to travel toward the illuminated zone LZ are divided. For example, as illustrated in FIG. 13, the polarization control unit 70 may be arranged between the scan device 65 and the optical element 50 in the optical path of the coherent light beams.

In addition, in the examples illustrated in FIGS. 8 and 11, although the example where the ½ wave plate 71 as a first polarization control element and the ¼ wave plate 75 as a second polarization control element are arranged to be adjacent to each other is illustrated, the ½ wave plate 71 as a first polarization control element and the ¼ wave plate 75 as a second polarization control element may be arranged to be separated from each other. For example, in the example illustrated in FIG. 13, the ¼ wave plate 75 as a second polarization control element may be arranged just before the spatial light modulator 30 to be separated from the ½ wave plate 71 as a first polarization control element.

In addition, as described above, various types of hologram may be used as the hologram recording medium 55 constituting the optical element 50. In the example illustrated in FIG. 13, a reflection-type hologram is used as the hologram recording medium 55.

Figure 13:
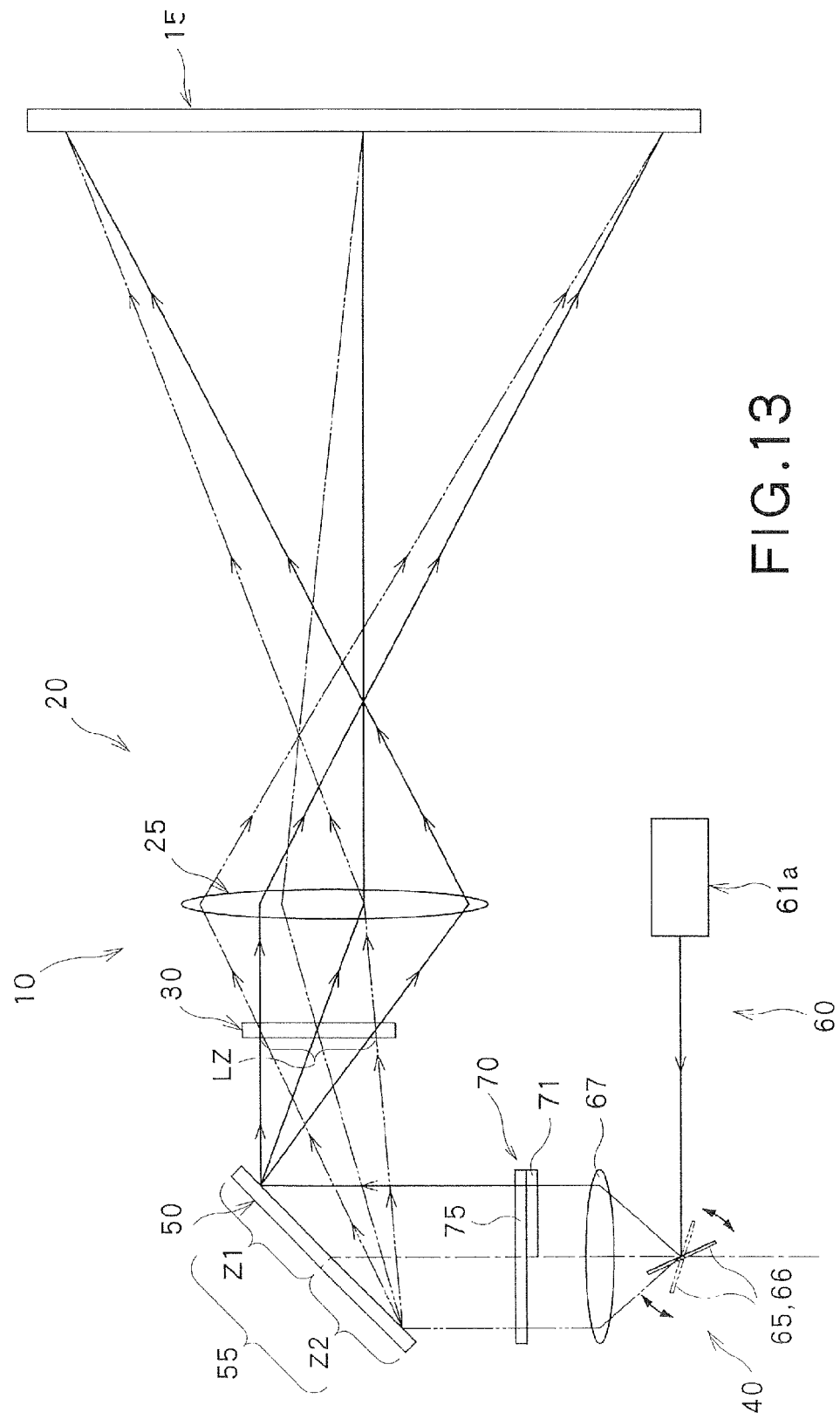
FIG. 13 is a diagram corresponding to FIG. 8 and a diagram illustrating another modified example of the illumination device.
Figure 14:
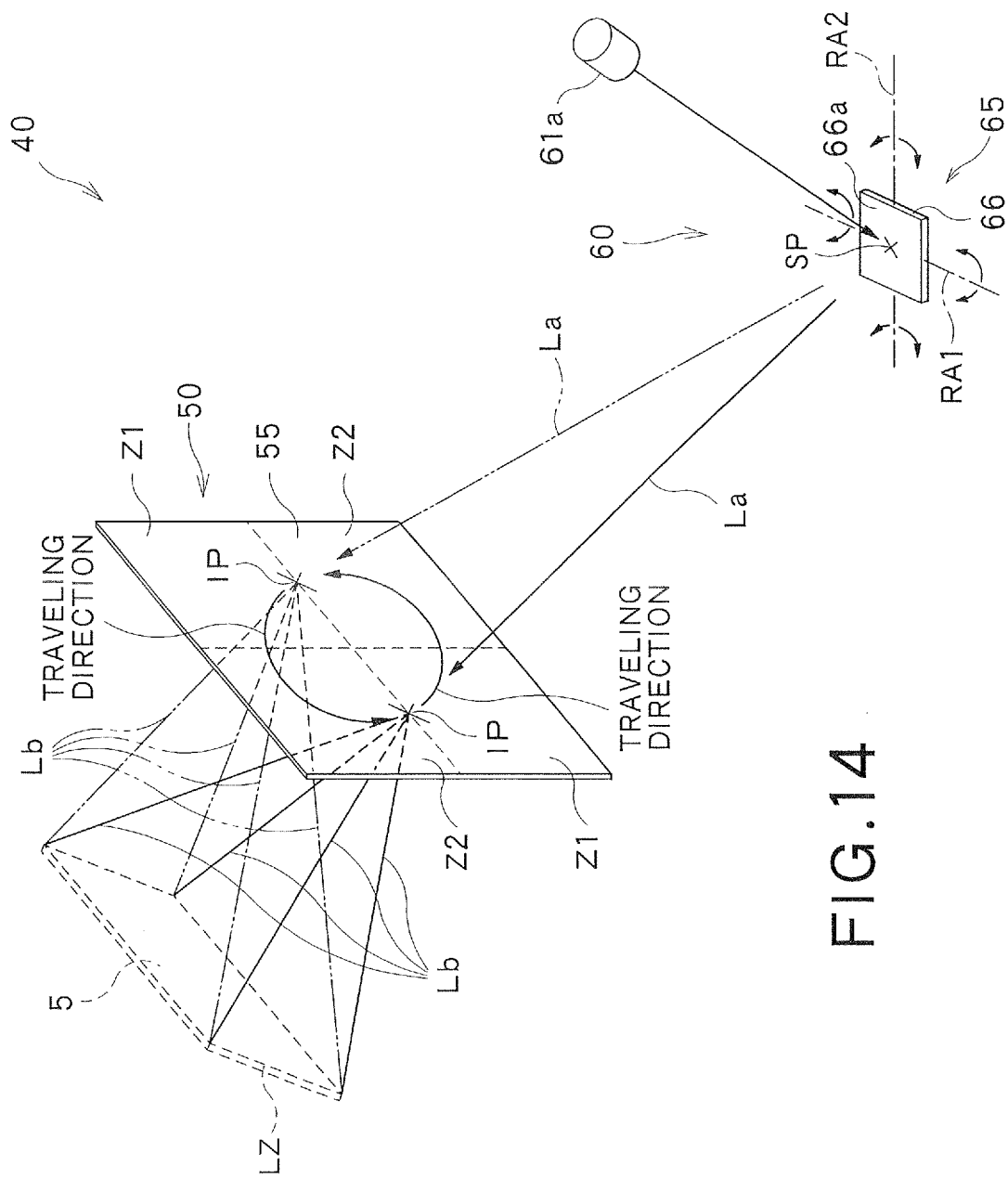
FIG. 14 is a diagram corresponding to FIG. 10 and a diagram illustrating still another modified example of the illumination device.

In addition, in the example illustrated in FIG. 13, as described above in the modified example of the basic embodiment, the irradiation device 60 is configured to irradiate the first optical element 50a with the coherent light beam along the optical path of one light ray of a virtual parallel light flux. In other words, the irradiation device 60 is configured to irradiate the respective positions of the hologram recording medium 55a of the first optical element 50a with the coherent light beam which travels in a certain direction. As a specific configuration, as illustrated in FIG. 13, in addition to the reflection device 66 described above, the scan device 65 may be configured to further include a lens 67 as a collimator which deflects the projection device of the light beam reflected by the reflection device 66 in a certain direction. According to the example, the optical path of the coherent light beam which is incident on the first zone Z1 to travel toward the illuminated zone LZ and the optical path of the coherent light beam which is incident on the second zone Z2 to travel toward the illuminated zone LZ can be securely divided. As a result, the illumination device 40 can illuminate the illuminated zone LZ with the coherent light beams having mutually different polarization components in a time division manner in a stabilized state; and the projection device 20 and projection-type image display device 10 can display the 3D image in a stabilized state.

In addition, in the example illustrated in FIG. 10, although the hologram recording medium 55 is divided in half in the Y axis direction (divided in half into upper and lower portions) into the first zone Z1 and the second zone Z2, the present invention is not limited thereto. If the hologram recording medium 55 is divided into the first zone Z1 and the second zone Z2 so that the first zone Z1 and the second zone Z2 are arranged along the scan path of the coherent light beams, the coherent light beams are allowed to scan both of the first zone Z1 and the second zone Z2. For example, in the example illustrated in FIG. 14, the coherent light beam is allowed to scan the hologram recording medium 55 along the circumference-shaped scan path. Therefore, the hologram recording medium 55 is divided into quarters along the circumference-shaped scan path, so that two first zones Z1 and two second zones Z2 are provided. In addition, the present invention is not limited to the example illustrated in FIG. 14, but the first zones Z1 and the second zones Z2 may be alternately aligned in a stripe shape or a lattice shape.

In addition, although the example where the one of the first polarization component (polarization component incident on the first zone Z1 of the hologram recording medium 55 to travel toward the illuminated zone LZ) and the second polarization component (polarization component incident on the second zone Z2 of the hologram recording medium 55 to travel toward the illuminated zone LZ) is a right circularly-polarized light beam and the other one of the first polarization component and the second polarization component is left circularly-polarized light beam is described with reference to FIG. 11, the present invention is not limited thereto. For example, the one of the first polarization component and the second polarization component may be a right elliptically-polarized light beam, and the other of the first polarization component and the second polarization component may be a left elliptically-polarized light beam.

In addition, the one of the first polarization component and the second polarization component may be configured to be a linearly-polarized light beam which vibrates in the one direction, and the other one of the first polarization component and the second polarization component may be configured to be a linearly-polarized light beam which vibrates in the other direction perpendicular to the one direction. In addition, in the example illustrated in FIG. 10, in the case where the ¼ wave plate 75 as a second polarization control element is not provided from the polarization control unit 70, the one of the first polarization component and the second polarization component may be configured to be a linearly-polarized light beam which vibrates in the one direction, and the other one of the first polarization component and the second polarization component may be configured to be a linearly-polarized light beam which vibrates in the other direction perpendicular to the one direction.

In addition, although the example where the light source 61a generates a linearly-polarized light beam having a vibration direction being aligned as a coherent light beam is described, the present invention is not limited thereto. For example, the light source 61a may be configured to generate a circularly-polarized light beam or an elliptically-polarized light beam having a certain circulation direction as a coherent light beam. In this example, the polarization control unit 70 may be configured to include a ½ wave plate 71 which is provided on an optical path through which only one of the coherent light beam incident on the first zone Z1 of the hologram recording medium 55 to travel toward the illuminated zone LZ (spatial light modulator 30) and the coherent light beam incident on the second zone Z2 of the hologram recording medium 55 to travel toward the illuminated zone LZ (spatial light modulator 30) passes. By the ½ wave plate 71, the circulation direction of the circularly-polarized light beam or the elliptically-polarized light beam passing through the associated ½ wave plate 71 can be changed into the reverse direction.

In addition, in the examples described hereinbefore, the polarization state of any one of the coherent light beam incident on the first zone Z1 of the hologram recording medium 55 to travel toward the illuminated zone LZ (spatial light modulator 30) and the coherent light beam incident on the second t zone Z2 of the hologram recording medium 55 to travel toward the illuminated zone LZ (spatial light modulator 30) is changed, so that the coherent light beam incident on the first zone Z1 to travel toward the illuminated zone LZ and the coherent light beam incident on the second zone Z2 to travel toward the illuminated zone LZ are configured with different polarization components. However, the light source 61a may be configured to generate a non-polarized coherent light beam, and the light beam having the first polarization component and the light beam having the second polarization component different from the first polarization component may be configured to be extracted from the coherent light beam generated by the laser source 61a. As a specific configuration, the polarization control unit may be configured to include a first polarizing plate which is provided on the optical path of the coherent light beam, which is incident on the first zone Z1 to travel toward the illuminated zone LZ, to selectively transmit the first polarization component and a second polarizing plate which is provided on the optical path of the coherent light beam, which is incident on the second zone Z2 to travel toward the illuminated zone LZ, to selectively transmit the second polarization component. In addition, the phrase "to selectively transmit" denotes the case where the targeted polarization component is transmitted with high transmittance than the other polarization components as well as the case where the targeted polarization component is transmitted with transmittance of 100% and the other polarization components are not transmitted.

In addition, as described above as the modified example of the basic embodiment, instead of the hologram recording medium 55 or in addition to the hologram recording medium 55, the optical element 50 may be configured to include a lens array as a light diffusion element 55 which changes the traveling directions of the coherent light beams irradiated on the respective positions and diffuses the coherent light beams to illuminate the entire area of the illuminated zone LZ with the coherent light beams. If the irradiation device 60 irradiates the optical element 50 with the coherent light beams so as to allow the coherent light beams to scan the first zone and the second zone of the lens array and the traveling directions of the coherent light beams incident from the irradiation device 60 on the respective positions of the lens array is changed by the lens array to illuminates the illuminated zone LZ (spatial light modulator 30) with the coherent light beams, similarly to the case where the illuminated zone LZ (spatial light modulator 30) is illuminated with the coherent light beams diffracted by the hologram recording medium 55, it is possible to effectively allow the speckles to be inconspicuous.

In addition, if the polarization control unit which controls the polarization of the coherent light beams on the optical path of the coherent light beams to the illuminated zone LZ is provided so that the coherent light beam which is incident on the first zone of the lens array to travel toward the illuminated zone LZ (spatial light modulator 30) is configured with the light beam having the first polarization component and so that the coherent light beam which is incident on the second zone of the lens array to travel toward the illuminated zone LZ (spatial light modulator 30) is configured with the light beam having the second polarization component different from the first polarization component, similarly to the case where the illuminated zone LZ (spatial light modulator 30) is illuminated with the coherent light beams diffracted by the hologram recording medium 55, the image can be allowed to be stereoscopically observed by using any one of dedicated glasses for the "active shutter glasses type" and dedicated glasses for the "passive polarized glasses type".

The invention claimed is:

1. An illumination device comprising:
an optical element including a hologram recording medium including a first zone and a second zone;
an irradiation device configured to irradiate the optical element with a coherent light beam such that the coherent light beam is allowed to scan the first zone and the second zone of the hologram recording medium, and such that the coherent light beams incident on respective positions in the first zone of the hologram recording medium are diffracted by the hologram recording medium to illuminate zones which overlap each other in at least a portion thereof with the coherent light beams, and the coherent light beams incident on respective positions in the second zone of the hologram recording medium are diffracted by the hologram recording medium to illuminate zones which overlap each other in at least the portion with the coherent light beams; and
a polarization control unit provided on an optical path of the coherent light beams, the polarization control unit being configured to control polarization of the coherent light beams such that a coherent light beam incident on the first zone of the hologram recording medium to travel toward a designated illumination zone has a first polarization component and such that a coherent light beam incident on the second zone of the hologram recording medium to travel toward a designated illumination zone has a second polarization component different from the first polarization component.

2. The illumination device according to claim 1,
wherein the hologram recording medium further includes an intermediate zone located between the first zone and the second zone, and
wherein a light absorption body is provided to absorb the coherent light beam on an optical path of the coherent light beam traveling toward the intermediate zone or an optical path of the coherent light beam traveling toward the designated illumination zone after incidence on the intermediate zone.

3. The illumination device according to claim 1,
wherein the hologram recording medium further includes an intermediate zone located between the first zone and the second zone, and
wherein the irradiation device performs irradiation intermittently with the coherent light beam so that the coherent light beams are incident on the first zone and the second zone but not incident on the intermediate zone.

4. The illumination device according to claim 1,
wherein one of the first polarization component and the second polarization component is right circularly-polarized light beam or right elliptically-polarized light beam, and
wherein the other of the first polarization component and the second polarization component is left circularly-polarized light beam or left elliptically-polarized light beam.

5. The illumination device according to claim 1,
wherein the polarization control unit is a polarization control element which is laminated on the optical element and which is configured to control polarization of the coherent light beam.

6. The illumination device according to claim 1,
wherein the irradiation device includes a light source which generates the coherent light beam and a scan device configured to change a traveling direction of the coherent light beam from the light source so as to allow the coherent light beam to scan the optical element, and
wherein the polarization control unit includes a polarization control element which is arranged between the scan device and the optical element on an optical path of the coherent light beam and which controls polarization of the coherent light beam.

7. The illumination device according to claim 1,
wherein the irradiation device includes a light source which generates the coherent light beam, and
wherein the light source generates a linearly-polarized light beam of which vibration direction is a certain direction.

8. The illumination device according to claim 7,
wherein the polarization control unit includes a ½ wave plate which is provided on an optical path of the coherent light beam incident on one of the first zone and the second zone to travel toward the designated illumination zone.

9. The illumination device according to claim 8,
wherein the polarization control unit includes a ¼ wave plate which is provided on an optical path of the coherent light beam incident on the first zone and the second zone to travel toward the designated illumination zone.

10. The illumination device according to claim 1,
wherein the irradiation device includes a light source which generates the coherent light beam, and
wherein the light source generates a circularly-polarized light beam or an elliptically-polarized light beam of which circulation direction is a certain direction.

11. The illumination device according to claim 10,
wherein the polarization control unit includes a ½ wave plate which is provided on an optical path of the coherent light beam incident on one of the first zone and the second zone to travel toward the designated illumination zone and which maintains polarization of the coherent light beam incident on the other of the first zone and the second zone to travel toward the designated illumination zone.

12. The illumination device according to claim 1,
wherein the irradiation device includes a light source which generates a non-polarized coherent light beam, and
wherein the polarization control unit includes:
a first polarizing plate which is provided on an optical path of the coherent light beam incident on the first zone to travel toward the designated illumination zone and selectively transmits the first polarization component; and
a second polarizing plate which is provided on an optical path of the coherent light beam incident on the second zone to travel toward the designated illumination zone and selectively transmits the second polarization component.

13. A projection device comprising:
the illumination device according to claim 1; and
a spatial light modulator positioned at a position which overlaps the designated illumination zone and which is illuminated by the illumination device, wherein the spatial light modulator forms a first modulation image corresponding to a coherent light beam having the first polarization component and a second modulation image corresponding to a coherent light beam having the second polarization component in a time division manner.

14. The projection device according to claim 13, further comprising a projection optical system configured to project a modulation image obtained on the spatial light modulator on a screen.

15. A projection-type image display device comprising:
the projection device according to claim 13; and
a screen on which a modulation image obtained on the spatial light modulator is projected.

16. An illumination device comprising:
an optical element including a light diffusion element including a first zone and a second zone to change a traveling direction of an incident light beam;
an irradiation device configured to irradiate the optical element with a coherent light beam such that the coherent light beam is allowed to scan the first zone and the second zone of the light diffusion element, and such that traveling directions of the coherent light beams incident on the respective positions of the first zone are changed by the light diffusion element so as to illuminate zones which overlap each other in at least a portion thereof with the coherent light beams, and traveling directions of the coherent light beams incident from the irradiation device on the respective positions of the second zone are changed by the light diffusion element so as to illuminate zones which overlap each other in at least the portion with the coherent light beams; and
a polarization control unit provided on an optical path of the coherent light beams, the polarization control unit being configured to control polarization of the coherent light beams such that a coherent light beam incident on the first zone of the light diffusion element to travel toward the designated illumination zone has a first polarization component and such that a coherent light beam incident on the second zone of the light diffusion element to travel toward the designated illumination zone has a second polarization component different from the first polarization component.

17. A projection device comprising:
the illumination device according to claim 16; and
a spatial light modulator positioned at a position which overlaps the designated illumination zone and which is illuminated by the illumination device,
wherein the spatial light modulator forms a first modulation image corresponding to a coherent light beam having the first polarization component and a second modulation image corresponding to a coherent light beam having the second polarization component in a time division manner.

18. The projection device according to claim 17, further comprising a projection optical system configured to project a modulation image obtained on the spatial light modulator on a screen.

19. A projection-type image display device comprising:
the projection device according to claim 17; and
a screen on which a modulation image obtained on the spatial light modulator is projected.

* * * * *